US012657809B2

(12) United States Patent
Bjørge

(10) Patent No.: US 12,657,809 B2
(45) Date of Patent: Jun. 16, 2026

(54) GRAPHICS PROCESSING

(71) Applicant: Arm Limited, Cambridge (GB)

(72) Inventor: Marius Bjørge, Trondheim (NO)

(73) Assignee: ARM Limited, Cambridge (GB)

( * ) Notice: Subject to any disclaimer, the term of this patent is extended or adjusted under 35 U.S.C. 154(b) by 141 days.

(21) Appl. No.: 18/437,169

(22) Filed: Feb. 8, 2024

(65) Prior Publication Data

US 2025/0259373 A1 Aug. 14, 2025

(51) Int. Cl.
*G06T 15/06* (2011.01)
*G06T 15/00* (2011.01)

(52) U.S. Cl.
CPC ............ *G06T 15/06* (2013.01); *G06T 15/005* (2013.01); *G06T 2200/28* (2013.01); *G06T 2210/12* (2013.01); *G06T 2210/21* (2013.01); *G06T 2210/52* (2013.01)

(58) Field of Classification Search
CPC ... G06T 15/06; G06T 15/005; G06T 2200/28; G06T 2210/12; G06T 2210/21; G06T 2210/52
See application file for complete search history.

(56) References Cited

U.S. PATENT DOCUMENTS 8,253,730 B1 * 8/2012 Carr ...................... G06T 17/005 345/419
2009/0225080 A1 * 9/2009 Keller ................... G06T 15/506 345/426
2018/0365879 A1 * 12/2018 Peterson ................. G06T 15/55
2021/0390758 A1 * 12/2021 Muthler ................ G06F 9/5027
2022/0245910 A1 * 8/2022 Lombardi ............... G06T 13/40
2022/0335678 A1 * 10/2022 Clark .................... G06T 15/005
2022/0351459 A1 * 11/2022 Smith-Lacey .......... G06T 15/06
2022/0351460 A1 * 11/2022 Fenney ................... G06T 15/06
2023/0118972 A1 * 4/2023 Wald ....................... G06T 17/10 707/778
2024/0127527 A1 * 4/2024 Smith-Lacey .......... G06T 15/06
2024/0249466 A1 * 7/2024 Bourd ..................... G06T 15/06

* cited by examiner

*Primary Examiner* — Kent W Chang
*Assistant Examiner* — Karl Duc Truong
(74) *Attorney, Agent, or Firm* — Pearl Cohen Zedek Latzer Baratz LLP

(57) ABSTRACT

A graphics processing system that is operable to perform ray tracing is disclosed. It may be determined whether a ray may intersect geometry associated with a node by testing the ray against two different types of geometric object associated with the node: a first type that defines the volume that the node represents, and a second, different type that defines a region of the volume that the node represents within which geometry does not fall.

17 Claims, 16 Drawing Sheets

GRAPHICS PROCESSING

BACKGROUND

The technology described herein relates to graphics processing systems, and in particular to the rendering of frames (images) for display using ray tracing.

FIG. 1 shows an exemplary system on-chip (SoC) graphics processing system 8 that comprises a host processor in the form of a central processing unit (CPU) 1, a graphics processor (GPU) 2, a display processor 3 and a memory controller 5.

As shown in FIG. 1, these units communicate via an interconnect 4 and have access to off-chip memory 6. In this system, the graphics processor 2 will render frames (images) to be displayed, and the display processor 3 will then provide the frames to a display panel 7 for display.

In use of this system, an application 13 such as a game, executing on the host processor (CPU) 1 will, for example, require the display of frames on the display panel 7. To do this, the application will submit appropriate commands and data to a driver 11 for the graphics processor 2 that is executing on the CPU 1. The driver 11 will then generate appropriate commands and data to cause the graphics processor 2 to render appropriate frames for display and to store those frames in appropriate frame buffers, e.g. in the main memory 6. The display processor 3 will then read those frames into a buffer for the display from where they are then read out and displayed on the display panel 7 of the display.

One rendering process that may be performed by a graphics processor is so-called "ray tracing". Ray tracing is a rendering process which involves tracing the paths of rays of light from a viewpoint (sometimes referred to as a "camera") back through sampling positions in an image plane into a scene, and simulating the effect of the interaction between the rays and geometry in the scene. The output data value for a sampling position in the image (plane) is determined based on the geometry in the scene intersected by the ray passing through the sampling position, and the properties of the surfaces of that geometry. The ray tracing calculation is complex, and involves determining, for each sampling position, a set of (zero or more) geometry objects within the scene which a ray passing through the sampling position intersects.

FIG. 2 illustrates an exemplary "full" ray tracing process. A ray 20 (the "primary ray") is cast backward from a viewpoint 21 (e.g. camera position) through a sampling position 22 in an image plane (frame) 23 into the scene that is being rendered. The point 24 at which the ray 20 first intersects geometry in the scene is identified. This first intersection will be with the geometry in the scene closest to the sampling position. In this example, the first intersected geometry is represented by a set (e.g. mesh) of triangle primitives, and the ray 20 is found to intersect a triangle primitive 25. A secondary ray in the form of shadow ray 26 may be cast from the first intersection point 24 to a light source 27. Depending upon the material of the surface of the intersected geometry, another secondary ray in the form of reflected ray 28 may be traced from the intersection point 24. If the intersected geometry is, at least to some degree, transparent, then a refracted secondary ray may be considered.

Ray tracing is considered to provide better, e.g. more realistic, physically accurate images than more traditional rasterisation rendering techniques, particularly in terms of the ability to capture reflection, refraction, shadows and lighting effects. However, ray tracing can be significantly more processing-intensive than traditional rasterisation, and so it is usually desirable to be able to accelerate ray tracing.

One way of accelerating ray tracing is the use of a ray tracing acceleration data structure, such as a bounding volume hierarchy (BVH), that is representative of the distribution of the geometry in the scene to be rendered to determine the intersection of rays with geometry in the scene being rendered (and then render sampling positions in the output rendered frame representing the scene accordingly). Ray tracing may thus typically comprise performing a traversal of a ray tracing acceleration data structure, which traversal involves testing rays for intersection with volumes represented by different nodes of the ray tracing acceleration data structure in order to determine which geometry may be intersected by which rays for a sampling position in the render output, and which geometry therefore may need to be further processed for the rays for the sampling position.

Typically, each node volume of a ray tracing acceleration data structure (e.g. BVH) is defined by a respective axis-aligned bounding box (AABB). Alternatively, a ray tracing acceleration data structure (e.g. BVH) may use another volume defining geometric object type (such as oriented bounding boxes (OBBs)) to define all of its node volumes, but this usually comes at a cost of increased processing requirements as compared to the relative simplicity of axis-aligned bounding boxes (AABBs).

The Applicant believes that there remains scope for improved techniques for performing ray tracing using a graphics processor.

BRIEF DESCRIPTION OF THE DRAWINGS

Embodiments of the technology described herein will now be described by way of example only and with reference to the accompanying drawings, in which.

DETAILED DESCRIPTION

Figure 1:
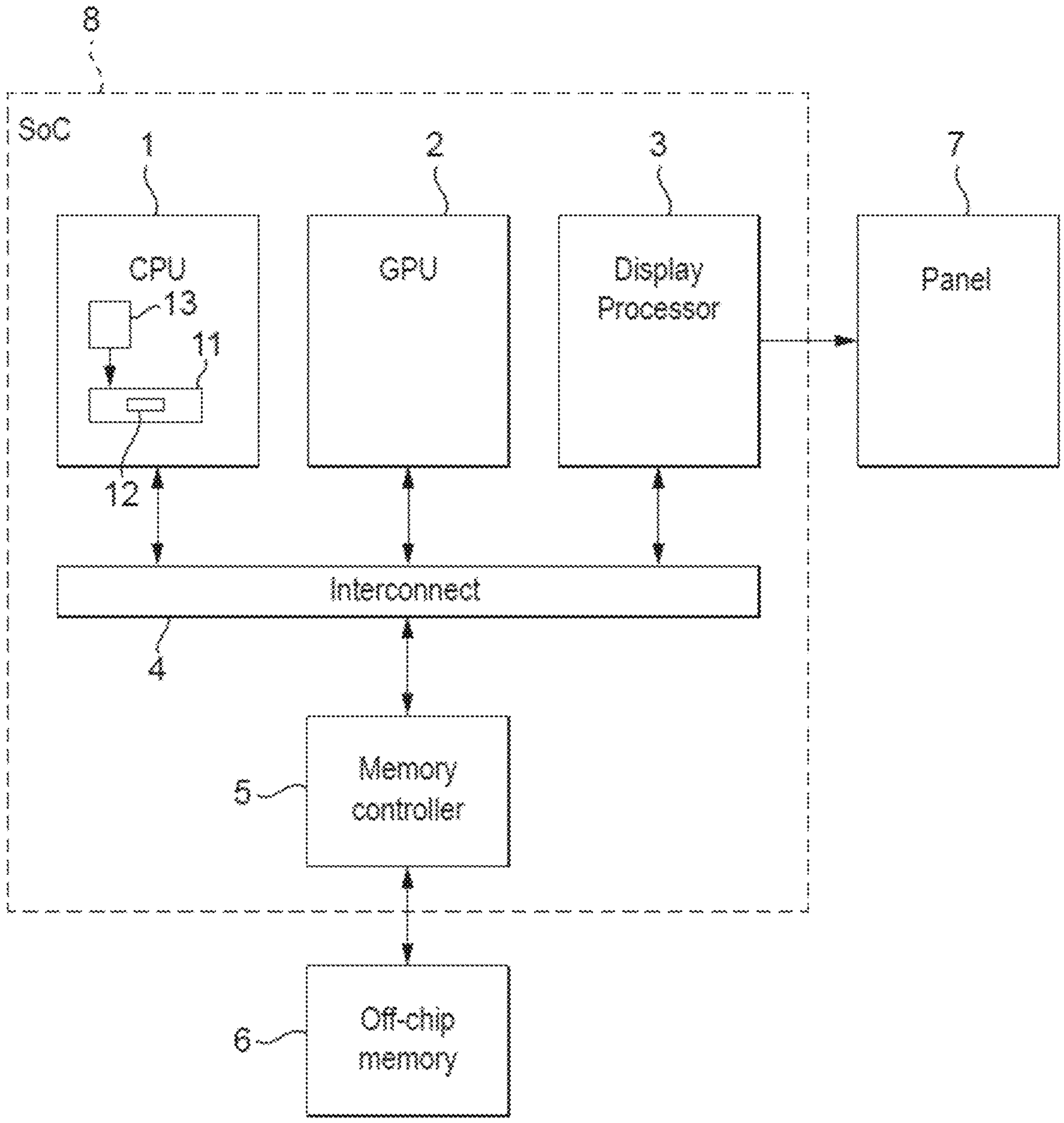
FIG. 1 shows an exemplary graphics processing system.

A first embodiment of the technology described herein comprises a method of operating a graphics processing system that is operable to perform ray tracing using a ray tracing acceleration data structure that is representative of a distribution of geometry in a scene to be rendered, wherein the ray tracing acceleration data structure comprises a plurality of nodes, wherein each node of the plurality of nodes represents a respective volume and is associated with geometry of the scene that falls within the respective volume, and wherein each volume represented by a node of the plurality of nodes is defined by a respective geometric object of a first type; the method comprising:

- for at least one node of the plurality of nodes of the ray tracing acceleration data structure: providing one or more geometric objects of a second, different type that (each) define a (respective) region of the volume represented by the node (defined by the respective geometric object of the first type) within which geometry associated with the node does or does not fall; and
- (rendering the scene by) tracing a ray by traversing the ray tracing acceleration data structure, and when a node is encountered for which one or more geometric objects of the second type have been provided: determining whether the ray may intersect geometry associated with the node by at least one of:
  - testing the ray against the geometric object of the first type that defines the volume that the node represents; and
  - testing the ray against (each of) the one or more geometric objects of the second type.

A second embodiment of the technology described herein comprises a graphics processing system that is operable to perform ray tracing using a ray tracing acceleration data structure that is representative of a distribution of geometry in a scene to be rendered, wherein the ray tracing acceleration data structure comprises a plurality of nodes, wherein each node of the plurality of nodes represents a respective volume and is associated with geometry of the scene that falls within the respective volume, and wherein each volume represented by a node of the plurality of nodes is defined by a respective geometric object of a first type; the graphics processing system comprising:

- a processing circuit configured to, for at least one node of a plurality of nodes of a ray tracing acceleration data structure: provide one or more geometric objects of a second, different type that (each) define a (respective) region of a volume represented by the node (defined by a respective geometric object of the first type) within which geometry associated with the node does or does not fall; and
- a ray tracing circuit configured to trace a ray (to render a scene) by traversing a ray tracing acceleration data structure, and when a node is encountered for which one or more geometric objects of the second type have been provided by the processing circuit: determine whether the ray may intersect geometry associated with the node by at least one of:
  - testing the ray against a geometric object of the first type that defines a volume that the node represents; and
  - testing the ray against (each of) the one or more geometric objects of the second type provided by the processing circuit.

The technology described herein is concerned with a graphics processing system performing ray tracing. In the technology described herein, the graphics processing system (comprises a ray tracing circuit that) is operable to perform ray tracing to render a scene by traversing a ray tracing acceleration data structure that is representative of a distribution of geometry (e.g. primitives) in the scene. The ray tracing acceleration data structure comprises a plurality of nodes, with each node of the plurality representing a respective volume that is defined by a respective geometric object of a first type, and being associated with geometry of the scene that falls within the respective volume. For example, and in embodiments, each node of the plurality is defined by a respective axis-aligned bounding box (AABB) that bounds at least some of the geometry (e.g. one or more primitives) of the scene to be rendered.

The ray tracing acceleration data structure may be arranged as a hierarchy of nodes representing a hierarchy of volumes defined by a hierarchy of geometric objects of the first type (e.g. a hierarchy of axis-aligned bounding boxes (AABBs)). Thus, in embodiments, the ray tracing acceleration data structure comprises one or more bounding volume hierarchies (BVHs). As will be discussed in more detail below, a (each) node of the plurality of nodes may thus be a “leaf” node that is associated with geometry that the leaf node (directly) represents, or a “non-leaf” node that is associated with the geometry that each leaf node that the node is related to (e.g. is a parent node of) represents.

In the technology described herein, as well as providing geometric objects of a first type (e.g. axis-aligned bounding boxes (AABBs)) that define the node volumes of the ray tracing acceleration data structure, one or more volume defining geometric objects of a second, different type are provided that (each) define a (respective) region (volume) of a node volume (defined by a geometric object of the first type (e.g. AABB)) within which geometry associated with the node does or does not fall. Thus, in embodiments, a (each) geometric object of the second type defines an “empty” region (volume) within a geometric object of the first type (e.g. AABB) and/or a “non-empty” region (volume) within the geometric object of the first type (e.g. AABB). As will be discussed in more detail below, the second type of geometric object is, in embodiments, a surface, e.g. a flat surface, e.g. a plane.

Both first and second types of geometric object may then be used in determining which geometry may be intersected by which rays. For example, and in embodiments, one or more planes are generated, with a (each) plane defining a region of an axis-aligned bounding box (AABB) volume within which none of the geometry (e.g. primitives) bounded by the AABB actually falls, and it is determined whether a ray intersects the geometry by testing the ray against the AABB to determine whether the ray intersects the AABB, and (when it is determined that the ray intersects the AABB) testing the ray against the one or more planes to determine whether the ray intersects a region of the AABB that at least one of the planes defines as being a region within which none of the geometry falls (and when it is determined that the ray does not intersect such a region of the AABB, testing the ray against the geometry to determine whether the ray intersects the geometry (and when it is determined that the ray intersects the geometry, further processing the geometry as appropriate)).

As will be discussed in more detail below, the Applicant has found that representing a distribution of geometry (e.g. primitives) using two different types of volume defining geometric objects in this manner can allow the geometry distribution to be more closely represented, e.g. as compared to typical ray tracing acceleration data structure arrangements that represent geometry distribution using only one type of geometric object, e.g. AABBs. This can lead to an overall reduction in the processing required to determine which geometry may be intersected by which rays, and thus accelerate ray tracing. As will be discussed below, using an AABB and one or more planes to define one or more regions of the AABB that do not contain any geometry (e.g. primitives) has been found to provide a particularly efficient arrangement.

It will be appreciated, therefore, that the technology described herein can provide an improved graphics processing system and ray tracing method.

The graphics processing system should, and in embodiments does, comprise a graphics processor (GPU). The graphics processing system may further comprise a host processor, e.g. a central processing unit (CPU). The host processor (e.g. CPU) may execute applications that can require graphics processing by the graphics processor (GPU), and send appropriate commands and data to the graphics processor (GPU) to control it to perform graphics processing operations and to produce graphics processing (render) output required by applications executing on the host processor (CPU).

To facilitate this, the host processor (CPU) in embodiments also executes a driver for the graphics processor (GPU). Thus, in embodiments, the graphics processing system comprises a graphics processor (GPU) that is in communication with a host microprocessor (CPU) that executes a driver for the graphics processor (GPU).

A (each) operation of the technology described herein may be performed by the graphics processor (GPU), and/or host processor (CPU), and/or another component of the graphics processing system, as appropriate. Correspondingly, a (each) circuit of the technology described herein may form part of the graphics processor (GPU), and/or host processor (CPU), and/or another component of the graphics processing system, as appropriate.

For example, providing one or more geometric objects of the second type may be performed by the graphics processor (GPU), and/or host processor (CPU), and/or another component of the graphics processing system. Thus, the processing circuit may be part of the graphics processor (GPU) and/or host processor (CPU), e.g. the driver, and/or another data processor.

In embodiments, (at least) ray tracing/acceleration data structure traversal is performed by a (the) graphics processor (GPU). Thus, in embodiments, (at least) the ray tracing circuit is part of a (the) graphics processor (GPU).

Thus, another embodiment of the technology described herein comprises a method of operating a graphics processor that is operable to perform ray tracing using a ray tracing acceleration data structure that is representative of a distribution of geometry in a scene to be rendered, wherein the ray tracing acceleration data structure comprises a plurality of nodes, wherein each node of the plurality of nodes represents a respective volume and is associated with geometry of the scene that falls within the respective volume, and wherein each volume represented by a node of the plurality of nodes is defined by a respective geometric object of a first type; wherein the plurality of nodes includes at least one node for which one or more geometric objects of a second, different type are provided that define a (respective) region of the volume represented by the node (defined by the respective geometric object of the first type) within which geometry associated with the node does or does not fall; the method comprising:

(rendering the scene by) tracing a ray by traversing the ray tracing acceleration data structure, and when a node is encountered for which one or more geometric objects of the second type are provided: determining whether the ray may intersect geometry associated with the node by at least one of:
- testing the ray against the geometric object of the first type that defines the volume that the node represents; and
- testing the ray against (each of) the one or more geometric objects of the second type.

Another embodiment of the technology described herein comprises a graphics processor comprising:

a ray tracing circuit operable to perform ray tracing using a ray tracing acceleration data structure that is representative of a distribution of geometry in a scene to be rendered, wherein the ray tracing acceleration data structure comprises a plurality of nodes, wherein each node of the plurality of nodes represents a respective volume and is associated with geometry of the scene that falls within the respective volume, and wherein each volume represented by a node of the plurality of nodes is defined by a respective geometric object of a first type; wherein the plurality of nodes includes at least one node for which one or more geometric objects of a second, different type are provided that define a (respective) region of the volume represented by the node (defined by a respective geometric object of the first type) within which geometry associated with the node does or does not fall; the graphics processor further comprising:

a testing circuit configured to, when a node is encountered by the ray tracing circuit for which one or more geometric objects of the second type are provided: determine whether the ray may intersect geometry associated with the node by at least one of:
- testing the ray against a geometric object of the first type that defines a volume that the node represents; and
- testing the ray against (each of) the one or more geometric objects of the second type.

The ray tracing circuit and the testing circuit may comprise separate circuits, or may be at least partially formed of shared processing circuits. For example, the ray tracing circuit may comprise the testing circuit.

These embodiments can, and in embodiments do, include any one or more or all of the optional features described herein, as appropriate. For example, the graphics processor may (comprise a (the) processing circuit operable to) provide the one or more geometric objects of the second type.

In embodiments of the technology described herein, the graphics processing system/processor is operable to perform ray tracing, e.g. and in embodiments, in order to generate a render output, such as a frame for display, e.g. that represents a view of a scene comprising one or more objects. The graphics processing system/processor may typically generate plural render outputs, e.g. a series of frames.

A render output will typically comprise an array of data elements (sampling points) (e.g. pixels), for each of which appropriate render output data (e.g. a set of colour value data) is generated by the graphics processing system/processor. A render output data may comprise colour data, for example, a set of red, green and blue, RGB values and a transparency (alpha, a) value.

The graphics processing system/processor may carry out ray tracing graphics processing operations in any suitable and desired manner. The graphics processing system/processor may comprise one or more programmable execution units (e.g. shader cores) operable to execute programs to perform graphics processing operations, and ray-tracing based rendering may be triggered and performed by a programmable execution unit of the graphics processing system/processor executing a graphics processing (e.g. shader) program that causes the programmable execution unit to perform ray tracing rendering processes.

The graphics processing system/processor may trace rays individually, or trace a group of plural rays together, e.g. such that the rays of a group visit nodes of the ray tracing acceleration data structure in the same order.

The graphics processing system/processor (comprises a ray tracing circuit that) is operable to perform ray tracing by traversing a ray tracing acceleration data structure. A (the) ray tracing acceleration data structure may be generated by the same graphics processor that then traverses the ray tracing acceleration data. Alternatively, a (the) ray tracing acceleration data structure may be generated by a different data processor to the graphics processor that traverses the ray tracing acceleration data. For example, a ray tracing acceleration data structure may be generated the host processor, e.g. CPU, or another processor, of a data processing system. In embodiments, the geometric objects are generated when generating the ray tracing acceleration data structure.

Thus, another embodiment of the technology described herein comprises a method of generating a ray tracing acceleration data structure for use by a graphics processor; the method comprising:

generating a ray tracing acceleration data structure that is representative of a distribution of geometry in a scene to be rendered, wherein the ray tracing acceleration data structure comprises a plurality of nodes, wherein each node of the plurality of nodes represents a respective volume and is associated with geometry of the scene that falls within the respective volume, and wherein each volume represented by a node of the plurality of nodes is defined by a respective geometric object of a first type; and for at least one node of the plurality of nodes of the ray tracing acceleration data structure: generating one or more geometric objects of a second, different type that (each) define a (respective) region of the volume represented by the node (defined by the respective geometric object of the first type) within which geometry associated with the node does or does not fall.

Another embodiment of the technology described herein comprises an apparatus operable to generate a ray tracing acceleration data structure for use by a graphics processor; the apparatus comprising:

a ray tracing acceleration data structure generating circuit operable to generate a ray tracing acceleration data structure that is representative of a distribution of geometry in a scene to be rendered, wherein the ray tracing acceleration data structure comprises a plurality of nodes, wherein each node of the plurality of nodes represents a respective volume and is associated with geometry of the scene that falls within the respective volume, and wherein each volume represented by a node of the plurality of nodes is defined by a respective geometric object of a first type; and a processing circuit operable to, for at least one node of the plurality of nodes of the ray tracing acceleration data structure: generate one or more geometric objects of a second, different type that (each) define a (respective) region of the volume represented by the node (defined by a respective geometric object of the first type) within which geometry associated with the node does or does not fall.

The ray tracing acceleration data structure generating circuit and the processing circuit may comprise separate circuits, or may be at least partially formed of shared processing circuits. For example, the ray tracing acceleration data structure generating circuit may comprise the processing circuit.

These embodiments can, and in embodiments do, include any one or more or all of the optional features described herein, as appropriate.

Typically in ray tracing, one or more rays are used to render a (each) sampling position in the render output, and for each ray being traced, it is determined whether/which geometry that is defined for the render output is intersected by the ray. Geometry determined to be intersected by a ray may be further processed, e.g. in order to determine a colour for the sampling position in question.

The geometry to be processed to generate a render output may comprise any suitable and desired graphics processing geometry. In embodiments, the geometry comprises graphics primitives, in embodiments in the form of polygons, such as triangles.

In general, there may be many millions of graphics primitives within a given scene, and millions of rays to be tested, such that it is not normally practical to test every ray against each and every graphics primitive. To speed up the ray tracing operation, embodiments of the technology described herein use a ray tracing acceleration data structure, such as a bounding volume hierarchy (BVH), that is representative of the distribution of the geometry in the scene that is to be rendered to determine the intersection of rays with geometry (e.g. objects) in the scene being rendered (and then render sampling positions in the output rendered frame representing the scene accordingly).

Ray tracing according to embodiments of the technology described herein therefore generally comprises (the ray tracing circuit) performing a traversal of the ray tracing acceleration data structure, which traversal involves testing rays for intersection with volumes represented by different nodes of the ray tracing acceleration data structure in order to determine which geometry may be intersected by which rays for a sampling position in the render output, and which geometry therefore may need to be further processed for the rays for the sampling position. Rays are tested for intersection with node volumes by testing the rays against geometric objects of the first type that define the node volumes.

In embodiments of the technology described herein, the traversal comprises, as well testing ray against geometric objects of the first type that define the node volumes, testing rays against geometric objects of a second, different type that define regions of node volumes that do or do not contain (any) geometry.

A geometric object of a first type can be any suitable geometric object that can define a bounding volume (within which geometry (e.g. primitives) associated with a node falls). Similarly, a geometric object of a second type can be any suitable geometric object that can define a (volumetric)

region within a bounding volume defined by a geometric object of the first type (within which geometry associated with the node volume does or does not fall).

The first type of geometric object should thus be, and in embodiments is, a volumetric (three-dimensional) shape that defines a bounding volume. For example, and in embodiments, the first type of geometric object is a bounding box, e.g. a parallelepiped, e.g. cuboid. In embodiments the first type of geometric object is an axis-aligned bounding box (AABB) (e.g. a cuboid having edges parallel to coordinate system (x, y, z) axes). Other bounding volumes, such as bounding spheres, would be possible.

The second type of geometric object is a different type of geometric object to the first type. Thus, in embodiments, the second type of geometric object is not (is other than) a bounding box. In embodiments, the second type of geometric object is not (is other than) an axis-aligned bounding box (AABB). The second type of geometric object could be a volumetric (three-dimensional) shape that defines a bounding volume.

In embodiments, the second type of geometric object is a surface that divides a bounding volume defined by the first type of geometric object (e.g. AABB) into (two) different (volumetric) regions, e.g. an "empty" region that does not contain any geometry, and a "non-empty" region that does contain geometry. Thus, in embodiments, the second type of geometric object is a surface, wherein one side of the surface defines an "empty" region of a bounding volume (e.g. AABB) and the other side of the surface defines a "non-empty" region of the bounding volume (e.g. AABB).

The second type of geometric object could be a curved surface. In embodiments, the second type of geometric object is a flat surface. In embodiments, the second type of geometric object is a plane.

Using an axis-aligned bounding box (AABB) and one or more planes has been found to be particularly efficient, as such geometric objects can be specified using a relatively small amount of information, and tested in a relatively simple (and thus quick) manner. For example, and in embodiments, an axis-aligned bounding box (AABB) may be specified (only) by a minimum and maximum value in each (x, y, z) dimension, and a (each) plane may be specified by (only) a normal vector and a position of a point on the plane. In embodiments, a (each) plane is specified by a normal vector and a distance from a centroid position of a corresponding axis-aligned bounding box (AABB).

Thus, another embodiment of the technology described herein comprises a method of operating a graphics processing system that is operable to perform ray tracing using a ray tracing acceleration data structure that is representative of a distribution of geometry in a scene to be rendered, wherein the ray tracing acceleration data structure comprises a plurality of nodes, wherein each node of the plurality of nodes represents a respective volume and is associated with geometry of the scene that falls within the respective volume, and wherein each volume represented by a node of the plurality of nodes is defined by a respective axis-aligned bounding box (AABB); the method comprising:

for at least one node of the plurality of nodes of the ray tracing acceleration data structure: providing one or more planes that (each) define a (respective) region of the volume represented by the node (defined by the respective axis-aligned bounding box (AABB)) within which geometry associated with the node does or does not fall; and (rendering the scene by) tracing a ray by traversing the ray tracing acceleration data structure, and when a node is encountered for which one or more planes have been provided: determining whether the ray may intersect geometry associated with the node by at least one of:

testing the ray against the axis-aligned bounding box (AABB) that defines the volume that the node represents; and testing the ray against (each of) the one or more planes.

Another embodiment of the technology described herein comprises a graphics processing system that is operable to perform ray tracing using a ray tracing acceleration data structure that is representative of a distribution of geometry in a scene to be rendered, wherein the ray tracing acceleration data structure comprises a plurality of nodes, wherein each node of the plurality of nodes represents a respective volume and is associated with geometry of the scene that falls within the respective volume, and wherein each volume represented by a node of the plurality of nodes is defined by a respective axis-aligned bounding box (AABB); the graphics processing system comprising:

a processing circuit configured to, for at least one node of a plurality of nodes of a ray tracing acceleration data structure: provide one or more planes that (each) define a (respective) region of a volume represented by the node (defined by a respective axis-aligned bounding box (AABB)) within which geometry associated with the node does or does not fall; and a ray tracing circuit configured to trace a ray (to render a scene) by traversing a ray tracing acceleration data structure, and when a node is encountered for which one or more planes have been provided by the processing circuit: determine whether the ray may intersect geometry associated with the node by at least one of:

testing the ray against an axis-aligned bounding box (AABB) that defines a volume that the node represents; and testing the ray against (each of) the one or more planes provided by the processing circuit.

Another embodiment of the technology described herein comprises a method of operating a graphics processor that is operable to perform ray tracing using a ray tracing acceleration data structure that is representative of a distribution of geometry in a scene to be rendered, wherein the ray tracing acceleration data structure comprises a plurality of nodes, wherein each node of the plurality of nodes represents a respective volume and is associated with geometry of the scene that falls within the respective volume, and wherein each volume represented by a node of the plurality of nodes is defined by a respective axis-aligned bounding box (AABB); wherein the plurality of nodes includes at least one node for which one or more planes are provided that define a (respective) region of the volume represented by the node (defined by the respective axis-aligned bounding box (AABB)) within which geometry associated with the node does or does not fall; the method comprising:

(rendering the scene by) tracing a ray by traversing the ray tracing acceleration data structure, and when a node is encountered for which one or more planes are provided: determining whether the ray may intersect geometry associated with the node by at least one of:

testing the ray against the axis-aligned bounding box (AABB) that defines the volume that the node represents; and testing the ray against (each of) the one or more planes.

Another embodiment of the technology described herein comprises a graphics processor comprising:

a ray tracing circuit operable to perform ray tracing using a ray tracing acceleration data structure that is representative of a distribution of geometry in a scene to be rendered, wherein the ray tracing acceleration data structure comprises a plurality of nodes, wherein each node of the plurality of nodes represents a respective volume and is associated with geometry of the scene that falls within the respective volume, and wherein each volume represented by a node of the plurality of nodes is defined by a respective axis-aligned bounding box (AABB); wherein the plurality of nodes includes at least one node for which one or more planes are provided that define a (respective) region of the volume represented by the node (defined by a respective axis-aligned bounding box (AABB)) within which geometry associated with the node does or does not fall; the graphics processor further comprising:

a testing circuit configured to, when a node is encountered by the ray tracing circuit for which one or more planes are provided: determine whether the ray may intersect geometry associated with the node by at least one of:
testing the ray against an axis-aligned bounding box (AABB) that defines a volume that the node represents; and
testing the ray against (each of) the one or more planes.

Another embodiment of the technology described herein comprises a method of generating a ray tracing acceleration data structure for use by a graphics processor; the method comprising:

generating a ray tracing acceleration data structure that is representative of a distribution of geometry in a scene to be rendered, wherein the ray tracing acceleration data structure comprises a plurality of nodes, wherein each node of the plurality of nodes represents a respective volume and is associated with geometry of the scene that falls within the respective volume, and wherein each volume represented by a node of the plurality of nodes is defined by a respective axis-aligned bounding box (AABB); and for at least one node of the plurality of nodes of the ray tracing acceleration data structure: generating one or more planes that (each) define a (respective) region of the volume represented by the node (defined by the respective axis-aligned bounding box (AABB)) within which geometry associated with the node does or does not fall.

Another embodiment of the technology described herein comprises an apparatus operable to generate a ray tracing acceleration data structure for use by a graphics processor; the apparatus comprising:

a ray tracing acceleration data structure generating circuit operable to generate a ray tracing acceleration data structure that is representative of a distribution of geometry in a scene to be rendered, wherein the ray tracing acceleration data structure comprises a plurality of nodes, wherein each node of the plurality of nodes represents a respective volume and is associated with geometry of the scene that falls within the respective volume, and wherein each volume represented by a node of the plurality of nodes is defined by a respective axis-aligned bounding box (AABB); and a processing circuit operable to, for at least one node of the plurality of nodes of the ray tracing acceleration data structure: generate one or more planes that (each) define a (respective) region of the volume represented by the node (defined by a respective axis-aligned bounding box (AABB)) within which geometry associated with the node does or does not fall.

These embodiments can, and in embodiments do, include any one or more or all of the optional features described herein, as appropriate.

A ray tracing acceleration data structure can be arranged in any suitable and desired manner. In embodiments, the ray tracing acceleration data structure comprises a tree structure that is configured such that each end (e.g. leaf) node of the tree structure (directly) represents a set of geometry (e.g. one or more primitives) defined within the respective volume that the end (e.g. leaf) node corresponds to, and with the other (non-leaf) nodes representing hierarchically-arranged larger volumes up to a root node at the top level of the tree structure that represents an overall volume for the render output (e.g. scene) in question that the tree structure corresponds to. The volume represented by each leaf node and each non-leaf node is defined by a respective geometric object of the first type (e.g. AABB).

Each non-leaf node is in embodiments a parent node for a respective set of plural child nodes with the parent node volume encompassing the volumes of its respective child nodes. In embodiments, each (non-leaf) parent node is associated with a respective plurality of child node volumes, each representing a (in embodiments non-overlapping) sub-volume within the overall volume represented by the (non-leaf) parent node in question. In embodiments, each (non-leaf) parent node is associated with the geometry represented by each leaf node that is related to (e.g. is a child node of, or is a grandchild node of, etc.) the respective parent node. Thus, in embodiments, at least one of the nodes of the ray tracing acceleration data structure is associated with a respective set of plural child nodes. In embodiments, there are multiple such parent nodes in the ray tracing acceleration data structure.

In embodiments, traversal of the ray tracing acceleration data structure comprises (the ray tracing circuit) proceeding down the "branches" of the tree structure and testing the rays against the child volumes associated with a node at a first level of the tree structure to thereby determine which child nodes in the next level of the tree structure should be tested, and so on, down to the level of the respective end (e.g. leaf) nodes at the end of the branches of the tree structure.

A ray tracing acceleration data structure could comprise, e.g. a single tree structure (e.g. BVH) representing the entirety of a scene being rendered. In embodiments, a ray tracing acceleration data structure comprises multiple "levels" of tree structures (e.g. BVHs).

For example, in embodiments, the ray tracing acceleration data structure comprises one or more "lowest level" tree structures (e.g. BVHs) (which may also be referred to as a "bottom level acceleration structure (BLAS)"), that each represent a respective instance or object within a scene to be rendered, and a "highest level" tree structure (e.g. BVH) (which may also be referred to as a "top level acceleration structure (TLAS)") that refers to the one or more "lowest level" tree structures. In this case, each "lowest level" tree structure may comprise end (e.g. leaf) nodes that represent a set of geometry (e.g. one or more primitives) associated with the respective instance or object, and the "highest level" tree structure may comprise end (e.g. leaf) nodes that point to, e.g. the root node of, one or more of the one or more "lowest level" tree structures.

In embodiments, each "lowest level" tree structure (e.g. BLAS) is defined in a space that is associated with the respective instance or object, e.g. a model space, whereas the "highest level" tree structure (e.g. TLAS) is defined in a space that is associated with the entire scene, e.g. a world space. In this case, each "highest level" tree structure end (e.g. leaf) node may include information indicative of an appropriate transformation between respective spaces. Correspondingly, traversal of the ray tracing acceleration data structure may comprise, when an end (e.g. leaf) node of the "highest level" tree structure is reached, applying a transformation indicated by the end (e.g. leaf) node, and then beginning traversal of the corresponding "lowest level" tree structure.

In embodiments of the technology described herein, traversal of the ray tracing acceleration data structure comprises testing a ray against a first type of geometric object (e.g. AABB) that defines a node volume, and testing the ray against a second, different type of geometric object (e.g. plane) that defines an "empty" and/or "non-empty" region of the node volume. A ray could be tested against a second type of geometric object (e.g. plane) for a node before being against the first type of geometric object (e.g. AABB) that defines the node's volume. However, in embodiments a ray is first tested against a first type of geometric object (e.g. AABB) that defines a node volume, and then against a (each) second type of geometric object (e.g. plane) that defines an "empty" region of the node volume. In embodiments, a ray is (only) tested against a second type of geometric object (e.g. plane) when it is determined that the ray intersects the corresponding first type of geometric object (e.g. AABB).

Thus, in embodiments, tracing a ray comprises: when a node is encountered for which one or more geometric objects of the second type (e.g. planes) are provided: determining whether the ray may intersect geometry associated with the node by: testing the ray against the geometric object of the first type (e.g. AABB) that defines the volume that the node represents to determine whether the ray intersects the geometric object of the first type (e.g. AABB); and when it is determined that the ray intersects the geometric object of the first type (e.g. AABB): testing the ray against (e.g., each of) the one or more geometric objects of the second type (e.g. planes).

In embodiments, when it is not determined that the ray intersects the geometric object of the first type (e.g. AABB) (when it is determined that the ray does not intersect the geometric object of the first type (e.g. AABB)), it is determined that the ray will not intersect any geometry associated with the node, and in this case traversing the ray tracing acceleration data structure may continue, e.g. with testing another node.

In embodiments, when it is determined that the ray intersects the geometric object of the first type (e.g. AABB), it is determined that the ray may intersect geometry associated with the node, and in this case the ray is tested against the one or more geometric objects of the second type (e.g. planes) to determine whether the ray intersects a region of the geometric object of the first type (e.g. AABB) that at least one of the one or more geometric objects of the second type (e.g. planes) defines as being a region within which geometry associated with the node does not fall.

Where there are plural provided geometric objects of the second type (e.g. planes), a ray may be tested against each geometric object of the second type (e.g. plane) in sequence. In embodiments, a ray is (only) tested against a next geometric object of the second type (e.g. plane) in the sequence when it is not determined that the ray intersects a region of the geometric object of the first type (e.g. AABB) that the previous geometric object of the second type (e.g. plane) in the sequence defines as being a region within which geometry associated with the node does not fall (when it is determined that the ray does not intersect a region of the geometric object of the first type (e.g. AABB) that the previous geometric object of the second type (e.g. plane) in the sequence defines as being a region within which geometry associated with the node does not fall).

In embodiments, when it is determined that the ray intersects a region of the geometric object of the first type (e.g. AABB) that at least one of the one or more geometric objects of the second type (e.g. planes) defines as being a region within which geometry associated with the node does not fall, it is determined that the ray will not intersect any geometry associated with the node, and in this case traversing the ray tracing acceleration data structure may continue, e.g. with testing another node.

In embodiments, when it is not determined that the ray intersects a region of the geometric object of the first type (e.g. AABB) that at least one of the one or more geometric objects of the second type (e.g. planes) defines as being a region within which geometry associated with the node does not fall (when it is determined that the ray does not intersect a region of the geometric object of the first type (e.g. AABB) that at least one of the one or more geometric objects of the second type (e.g. planes) defines as being a region within which geometry associated with the node does not fall), it is determined that the ray may intersect geometry associated with the node. In this case, if the node is a parent node, traversing the ray tracing acceleration data structure may continue with testing child nodes of the parent node. If, however, the node is an end (leaf) node that represents a set of geometry (e.g. one or more primitives), the ray may be tested against the geometry (e.g. one or more primitives) to determine whether the ray intersects the geometry (e.g. one or more primitives).

Thus, once it has been determined by performing a traversal operation for a ray which end (e.g. leaf) nodes represent geometry that may be intersected by a ray, the actual geometry intersections for the ray for the geometry that occupies the volumes associated with the intersected end (e.g. leaf) nodes can be determined accordingly, e.g. by testing the ray for intersection with the individual units of geometry (e.g. primitives) defined for the render output (e.g. scene) that occupy the volumes associated with the end (e.g. leaf) nodes.

Thereafter, once the geometry intersections for the rays being used to render a sampling position have been determined, it can then be (and in embodiments is) determined what appearance the sampling position should have, and the sampling position rendered accordingly.

Thus, in embodiments, the (e.g. ray tracing circuit of the) graphics processor/system is operable to perform ray-volume intersection tests in which it is determined whether a ray intersects a volume represented by a node of the ray tracing acceleration data structure defined by a geometric object of the first type (e.g. AABB). In embodiments, the (e.g. ray tracing circuit of the) graphics processor/system is (also) operable to perform ray-object (e.g. ray-plane) tests in which it is determined whether a ray intersects an empty region defined by a geometric object of the second type (e.g. plane). In embodiments, the (e.g. ray tracing circuit of the) graphics processor/system is (also) operable to perform ray-geometry (e.g. primitive) intersection tests in which it is determined whether a ray intersects geometry (e.g. a primitive) occupying a volume represented by a node of the ray tracing acceleration data structure.

Such tests may be performed by a programmable execution unit of the graphics processor/system executing an appropriate program. In embodiments, the (e.g. ray tracing circuit of the) graphics processor/system comprises one or more testing circuits operable to perform such tests, and that are in embodiments (substantially) fixed function circuit(s). In embodiments, the execution of an appropriate program instruction triggers the programmable execution unit to message a testing circuit to cause the testing circuit to perform an appropriate test.

Testing a ray against a geometric object can be performed in any suitable and desired manner. A ray may be associated with a range (between a minimum and maximum length) within which intersections are determined (and outside of which intersections may be ignored).

In embodiments, testing a ray against a geometric object comprises determining zero or more positions at which the ray intersects (e.g. an edge of) the object (within the ray range). For example, and in embodiments, in the case of a bounding volume (e.g. AABB), a position at which a ray enters the bounding volume (e.g. AABB) may be determined, and a position at which the ray exits the bounding volume (e.g. AABB) may be determined, and the determined positions may be used to determine whether the ray intersects the bounding volume (e.g. AABB).

In the case of a surface (e.g. plane), a position at which a ray crosses the surface (e.g. plane) may be determined. In embodiments, testing a ray against a surface (e.g. plane) (further) comprises determining a direction in which the ray crosses the surface (e.g. plane). For example, and in embodiments, it is determined whether the ray crosses the surface (e.g. plane) from an "empty" side to a "non-empty" side (or whether the ray crosses the surface (e.g. plane) from the "non-empty" side to the "empty" side).

In embodiments, it is determined whether a ray intersects a region of a bounding volume (e.g. AABB) that a surface (e.g. plane) defines as being empty by determining whether (within the ray range) the ray crosses the surface (e.g. plane) from an "empty" side to a "non-empty" side after the ray exits the bounding volume (e.g. AABB). It may be determined that the ray does intersect a region of the bounding volume (e.g. AABB) that the surface (e.g. plane) defines as being empty when it is determined that the ray crosses the surface (e.g. plane) from the "empty" side to the "non-empty" side after the ray exits the bounding volume (e.g. AABB).

Additionally or alternatively, it may be determined whether a ray intersects a region of a bounding volume (e.g. AABB) that a surface (e.g. plane) defines as being empty by determining whether (within the ray range) the ray crosses the surface (e.g. plane) from a "non-empty" side to an "empty" side before the ray enters the bounding volume (e.g. AABB). It may be determined that the ray does intersect a region of the bounding volume (e.g. AABB) that the surface (e.g. plane) defines as being empty when it is determined that the ray crosses the surface (e.g. plane) from the "non-empty" side to the "empty" side before the ray enters the bounding volume (e.g. AABB).

In embodiments, determining whether a ray intersects a region of a bounding volume (e.g. AABB) that a surface (e.g. plane) defines as being empty uses at least some parameter values (e.g. positions) determined when determining whether the ray intersects the bounding volume (e.g. AABB).

Geometric objects of the second type (e.g. planes) can be provided (e.g. generated) in any suitable and desired manner. A node may be provided with no geometric objects of the second type (e.g. planes), only one geometric object of the second type (e.g. plane), or plural different geometric objects of the second type (e.g. planes), e.g. with each different geometric object of the second type (e.g. plane) defining a respective empty region of the respective node volume. For example, 2, 3, 4, 5, 6, 7, 8, or more geometric objects of the second type (e.g. planes) may be provided (e.g. generated) for a node.

Similarly, one or more geometric objects of the second type (e.g. planes) may be provided for only one node or plural different (e.g. some or all) nodes may each be provided with a respective set of one or more geometric objects of the second type (e.g. planes). In the case of a hierarchical ray tracing acceleration data structure (e.g. BVH), one or more geometric objects of the second type (e.g. planes) may be provided for nodes at only one level of the hierarchy, or for nodes at plural different (e.g. some or all) levels of the hierarchy.

In embodiments, providing a geometric object comprises generating and storing data specifying the geometric object. For example, and in embodiments (and as mentioned above), data specifying an axis-aligned bounding box (AABB) may indicate a minimum and maximum value in each (x, y, z) dimension. Data specifying a plane may indicate a normal vector and a position of a point on the plane, e.g. a normal vector and a distance from a centroid position of a corresponding axis-aligned bounding box (AABB).

Geometric object specifying data can be stored in any suitable manner. In embodiments, the data provided for a node is stored in association with a parent node that the node is a child node of. Thus, data specifying a geometric object of the first type (e.g. AABB) that defines a child node volume may be stored in association with a parent node of the child node. Data specifying a geometric object of the second type (e.g. plane) that defines an empty region of a (the) child node volume may (also) be stored in association with a (the) parent node of the child node. In embodiments, geometric object specifying data stored in association with a parent node includes data that specifies geometric objects (of the first and/or second type) for plural (e.g. all) child nodes of the parent node.

Geometric object specifying data stored in association with a parent node may specify geometric objects for child nodes of the parent node separately. However, in embodiments, at least some data stored in association with a parent node is common to plural child nodes of the parent node. This can reduce storage requirements.

For example, and in embodiments, in the case of a plane specified by a direction and a position/distance, at least two planes may be provided that are parallel to each other (for plural child nodes of a parent node), and data specifying a (normal vector) direction for the at least two planes (stored in association with the parent node) may be common to the at least two planes (e.g. as opposed to storing separate direction indicating data for each plane). In this case, separate position/distance specifying data may be provided for each of the at least two planes (and stored in association with the parent node).

Geometric objects of the second type (e.g. planes) can be generated in any suitable and desired manner. In embodiments, geometric objects of the second type (e.g. planes) are generated based on the geometry that the ray tracing acceleration data structure represents, e.g. in a "bottom-up" process. Thus, in embodiments, a ray tracing acceleration data structure having node volumes defined by geometric objects of the first type (e.g. AABBs) is first generated, and then geometric objects of the second type are generated to define "empty" regions of the node volumes.

In embodiments, a set of one or more geometric objects of the second type (e.g. planes) is first generated for a (each)

leaf node of the ray tracing acceleration data structure based on the geometry that the leaf node represents. This may comprise generating a set of candidate objects of the second type (e.g. planes), wherein each candidate object in the set divides a leaf node volume (defined by a geometric object of the first type (e.g. AABB)) into (at least) a "non-empty" region within which geometry associated with the node falls, and an "empty" region within which geometry associated with the node does not fall. One or more candidates in the set may then be selected, e.g. a candidate having a largest "empty" region (or smallest "non-empty" region) may be selected.

Once a set of one or more geometric objects of the second type (e.g. planes) has been generated for a (each) leaf node, a set of one or more geometric objects of the second type (e.g. planes) for a (each) higher level node may be generated by propagating sets of one or more geometric objects of the second type (e.g. planes) up to higher level nodes of the ray tracing acceleration data structure. Thus, a set of one or more geometric objects of the second type (e.g. planes) for a (each) parent node may be generated based on respective sets of one or more geometric objects of the second type (e.g. planes) generated for the child nodes of the parent nodes. This may comprise selecting one or more geometric objects of the second type (e.g. planes) generated for the child nodes of a parent node, e.g. a geometric object of the second type (e.g. plane) having a largest "empty" region (or smallest "non-empty" region) may be selected.

Other arrangements are possible.

Each embodiment of the technology described herein can, and in embodiments does, include one or more, and in embodiments all, features of other embodiments of the technology described herein, as appropriate.

The technology described herein can be implemented in any suitable system, such as a suitably configured microprocessor based system. In embodiments, the technology described herein is implemented in a computer and/or micro-processor based system. The technology described herein is in embodiments implemented in a portable device, such as, and in embodiments, a mobile phone or tablet.

The technology described herein is applicable to any suitable form or configuration of graphics processor and graphics processing system, such as graphics processors (and systems) having a "pipelined" arrangement (in which case the graphics processor executes a rendering pipeline).

In embodiments, the various functions of the technology described herein are carried out on a single data processing platform that generates and outputs data, for example for a display device.

As will be appreciated by those skilled in the art, the data/graphics processing system may include, e.g., and in embodiments, a host processor that, e.g., executes applications that require processing by the graphics processor. The host processor will send appropriate commands and data to the graphics processor to control it to perform graphics processing operations and to produce graphics processing output required by applications executing on the host processor. To facilitate this, the host processor should, and in embodiments does, also execute a driver for the processor and optionally a compiler or compilers for compiling (e.g. shader) programs to be executed by (e.g. an (programmable) execution unit of) the processor.

The graphics processor and/or graphics processing system may also comprise, and/or be in communication with, one or more memories and/or memory devices that store the data described herein, and/or store software (e.g. (shader) program) for performing the processes described herein. The processor and/or system may also be in communication with and/or include a host microprocessor, and/or with a display for displaying images based on data generated by the processor/system.

The technology described herein can be used for all forms of input and/or output that a graphics processor may use or generate. For example, the graphics processor may execute a graphics processing pipeline that generates frames for display, render-to-texture outputs, etc., The output data values from the processing are in embodiments exported to external, e.g. main, memory, for storage and use, such as to a frame buffer for a display.

The various functions of the technology described herein can be carried out in any desired and suitable manner. For example, the functions of the technology described herein can be implemented in hardware or software, as desired. Thus, for example, the various functional elements, stages, and "means" of the technology described herein may comprise a suitable processor or processors, controller or controllers, functional units, circuitry, circuit(s), processing logic, microprocessor arrangements, etc., that are operable to perform the various functions, etc., such as appropriately dedicated hardware elements (processing circuit(s)) and/or programmable hardware elements (processing circuit(s)) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuit(s), etc., if desired.

Furthermore, any one or more or all of the processing stages of the technology described herein may be embodied as processing stage circuitry/circuits, e.g., in the form of one or more fixed-function units (hardware) (processing circuitry/circuits), and/or in the form of programmable processing circuitry/circuits that can be programmed to perform the desired operation. Equally, any one or more of the processing stages and processing stage circuitry/circuits of the technology described herein may be provided as a separate circuit element to any one or more of the other processing stages or processing stage circuitry/circuits, and/or any one or more or all of the processing stages and processing stage circuitry/circuits may be at least partially formed of shared processing circuitry/circuits.

Subject to any hardware necessary to carry out the specific functions discussed above, the components of the graphics processing system can otherwise include any one or more or all of the usual functional units, etc., that such components include.

It will also be appreciated by those skilled in the art that all of the described embodiments of the technology described herein can include, as appropriate, any one or more or all of the optional features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a data processor, renderer or other system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

The present embodiments relate to the operation of a graphics processor, e.g. in a graphics processing system as illustrated in FIG. 1, when performing rendering of a scene to be displayed using a ray tracing-based rendering process.

Ray tracing is a rendering process which involves tracing the paths of rays of light from a viewpoint (sometimes referred to as a "camera") back through sampling positions in an image plane (which is the frame being rendered) into a scene, and simulating the effect of the interaction between the rays and objects in the scene. The output data value e.g. colour of a sampling position in the image is determined based on the object(s) in the scene intersected by the ray passing through the sampling position, and the properties of the surfaces of those objects. The ray tracing process thus involves determining, for each sampling position, a set of (zero or more) objects within the scene which a ray passing through the sampling position intersects.

Figure 2:
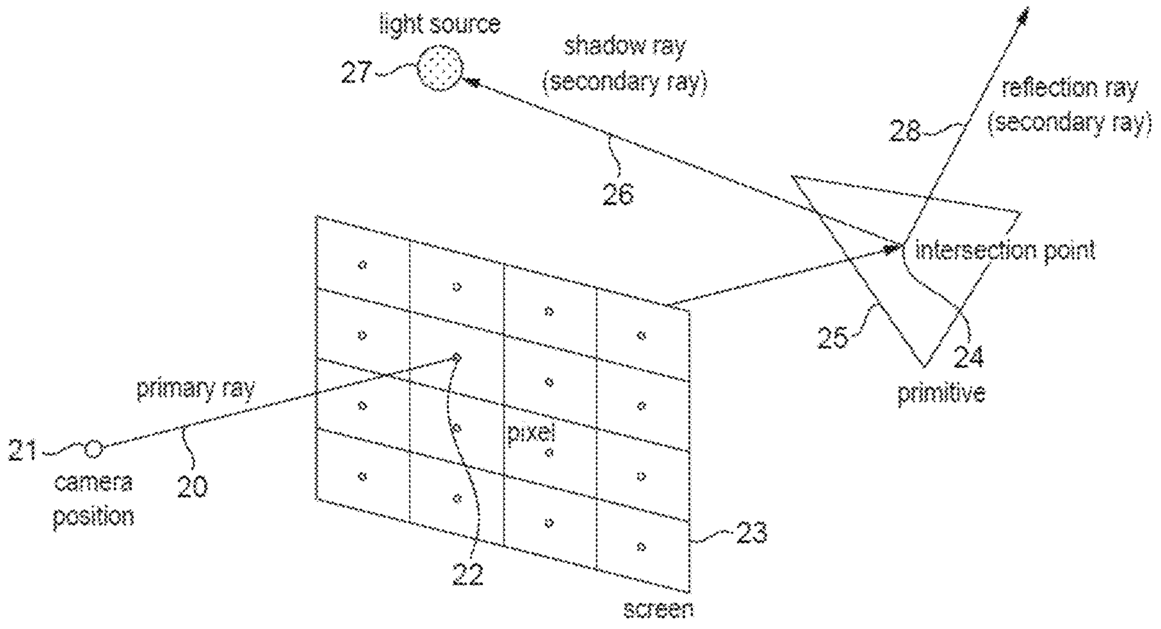
FIG. 2 is a schematic diagram illustrating a "full" ray tracing process.

FIG. 2 illustrates an exemplary "full" ray tracing process. A ray 20 (the "primary ray") is cast backward from a viewpoint 21 (e.g. camera position) through a sampling position 22 in an image plane (frame) 23 into the scene that is being rendered. The point 24 at which the ray 20 first intersects an object, which in this case is represented by a triangle primitive 25, in the scene is identified. This first intersection will be with the object in the scene closest to the sampling position.

A secondary ray in the form of shadow ray 26 may be cast from the first intersection point 24 to a light source 27. Depending upon the material of the surface of the object, another secondary ray in the form of reflected ray 28 may be traced from the intersection point 24. If the object is, at least to some degree, transparent, then a refracted secondary ray may be considered.

Such casting of secondary rays may be used where it is desired to add shadows and reflections into the image. A secondary ray may be cast in the direction of each light source (and, depending upon whether or not the light source is a point source, more than one secondary ray may be cast back to a point on the light source).

In the example shown in FIG. 2, only a single bounce of the primary ray 20 is considered, before tracing the reflected ray back to the light source. However, a higher number of bounces may be considered if desired.

The output data for the sampling position 22 i.e. a colour value (e.g. RGB value) thereof, is then determined taking into account the interactions of the primary, and any secondary, ray(s) cast, with objects in the scene. The same process is conducted in respect of each sampling position to be considered in the image plane (frame) 23.

In order to facilitate such ray tracing processing, in the present embodiments, acceleration data structures indicative of the geometry (e.g. objects) in scenes to be rendered are used when determining the intersection data for the ray(s) associated with a sampling position in the image plane to identify a subset of the geometry which a ray may intersect.

The ray tracing acceleration data structure represents and indicates the distribution of geometry (e.g. objects) in the scene being rendered, and in particular the geometry that falls within respective (sub-) volumes in the overall volume of the scene (that is being considered).

In the present embodiments, a ray tracing acceleration data structure is in the form of one or more Bounding Volume Hierarchy (BVH) trees. The use of BVH trees allows and facilitates testing a ray against a hierarchy of bounding volumes until a leaf node is found. It is then only necessary to test the geometry associated with the particular leaf node for intersection with the ray.

Figure 3A:
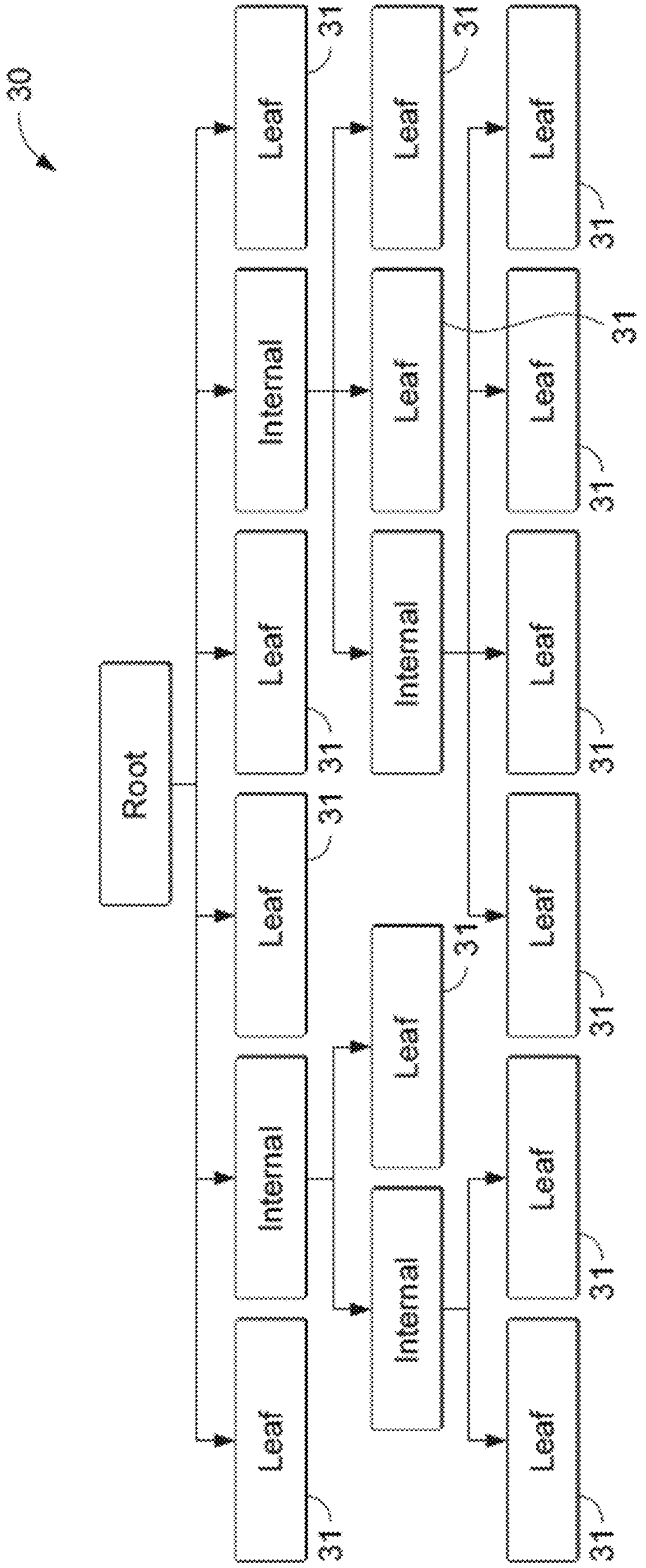
FIG. 3A and FIG. 3B show exemplary ray tracing acceleration data structures.

FIG. 3A shows an exemplary BVH tree 30, constructed by enclosing a volume in an axis-aligned bounding box (AABB), i.e. a cuboid, and then recursively sub-dividing the bounding volume into successive sub-AABBs according to any suitable and desired sub-division scheme, until a desired smallest sub-division (volume) is reached.

In this example, the BVH tree 30 is a relatively "wide" tree wherein each bounding volume is sub-divided into up to six sub-AABBs. However, in general, any other suitable tree structure may be used, and a given node of the tree may have any suitable and desired number of child nodes.

Thus, each node in the BVH tree 30 will have a respective volume associated with it, with the end, leaf nodes 31 each representing a particular smallest sub-divided volume, and any parent node representing, and being associated with, the volume of its child nodes.

A complete scene may be represented by a single BVH tree, e.g. with the tree storing the geometry for the scene, e.g. in world space. In this case, each leaf node of the BVH tree 30 may be associated with the geometry defined for the scene that falls, at least in part, within the volume that the leaf node corresponds to (e.g. whose centroid falls within the volume in question). The leaf nodes 31 may represent unique (non-overlapping) subsets of primitives defined for the scene falling within the corresponding volumes for the leaf nodes 31.

Figure 3B:
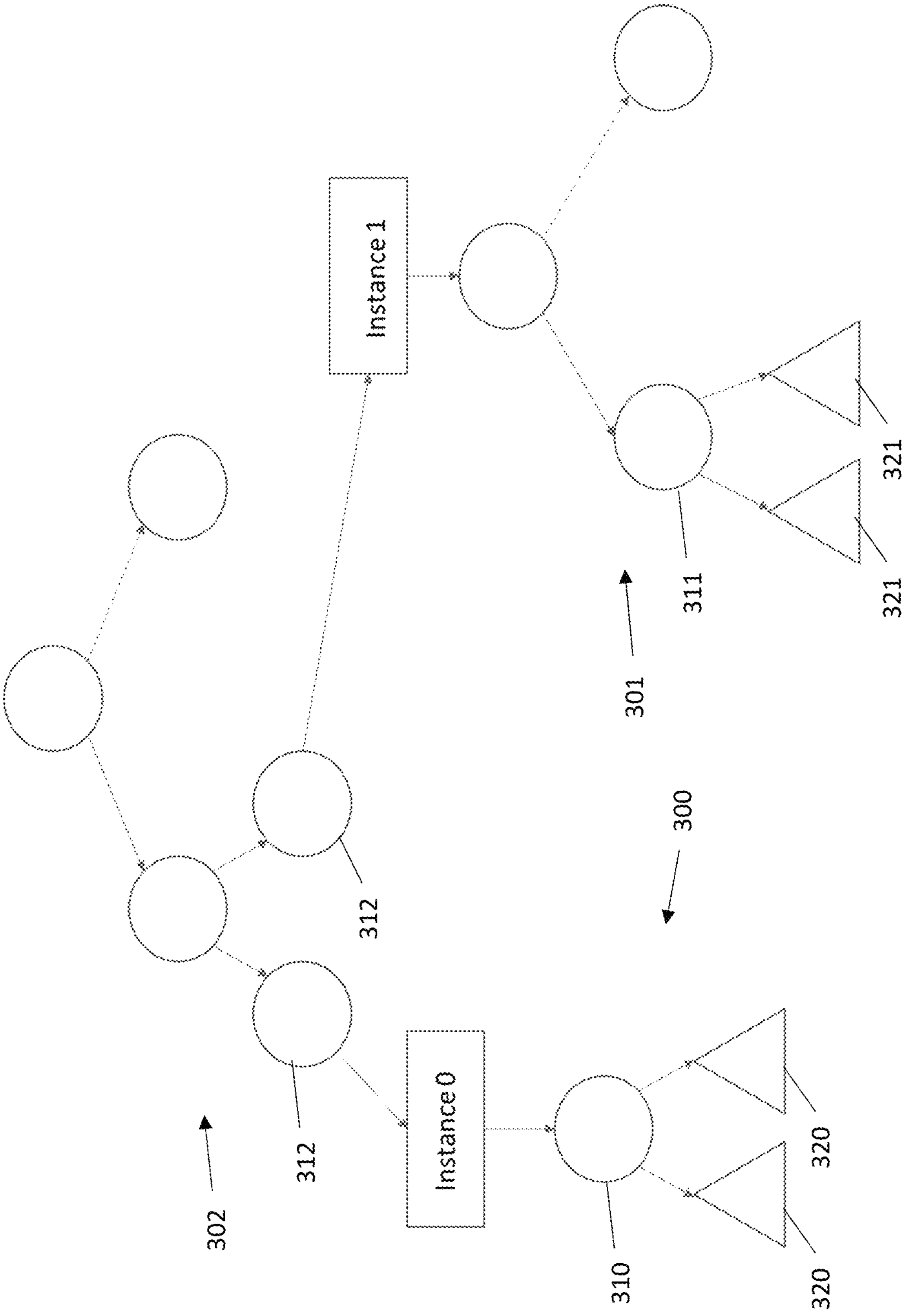

In the present embodiments, a two-level ray tracing acceleration data structure is used. FIG. 3B shows an exemplary two-level ray tracing acceleration data structure in which each instance or object is associated with a respective bottom-level acceleration structure (BLAS) 300, 301, which in the present embodiments is in the form of a respective BVH tree that stores geometry in a model space, with each leaf node 310, 311 of the BVH tree representing a unique subset of primitives 320, 321 defined for the instance or object falling within the corresponding volume.

A separate top-level acceleration structure (TLAS) 302 then contains references to the set of bottom-level acceleration structures (BLAS), together with a respective set of shading and transformation information for each bottom-level acceleration structure (BLAS). In the present embodiments, the top-level acceleration structure (TLAS) 302 is defined in a "top-level" space (e.g. world space) and is in the form of a BVH tree having leaf nodes 312 that each point to one or more of the bottom-level acceleration structures (BLAS) 300, 301.

Other forms of ray tracing acceleration data structure would be possible.

Figure 4A:
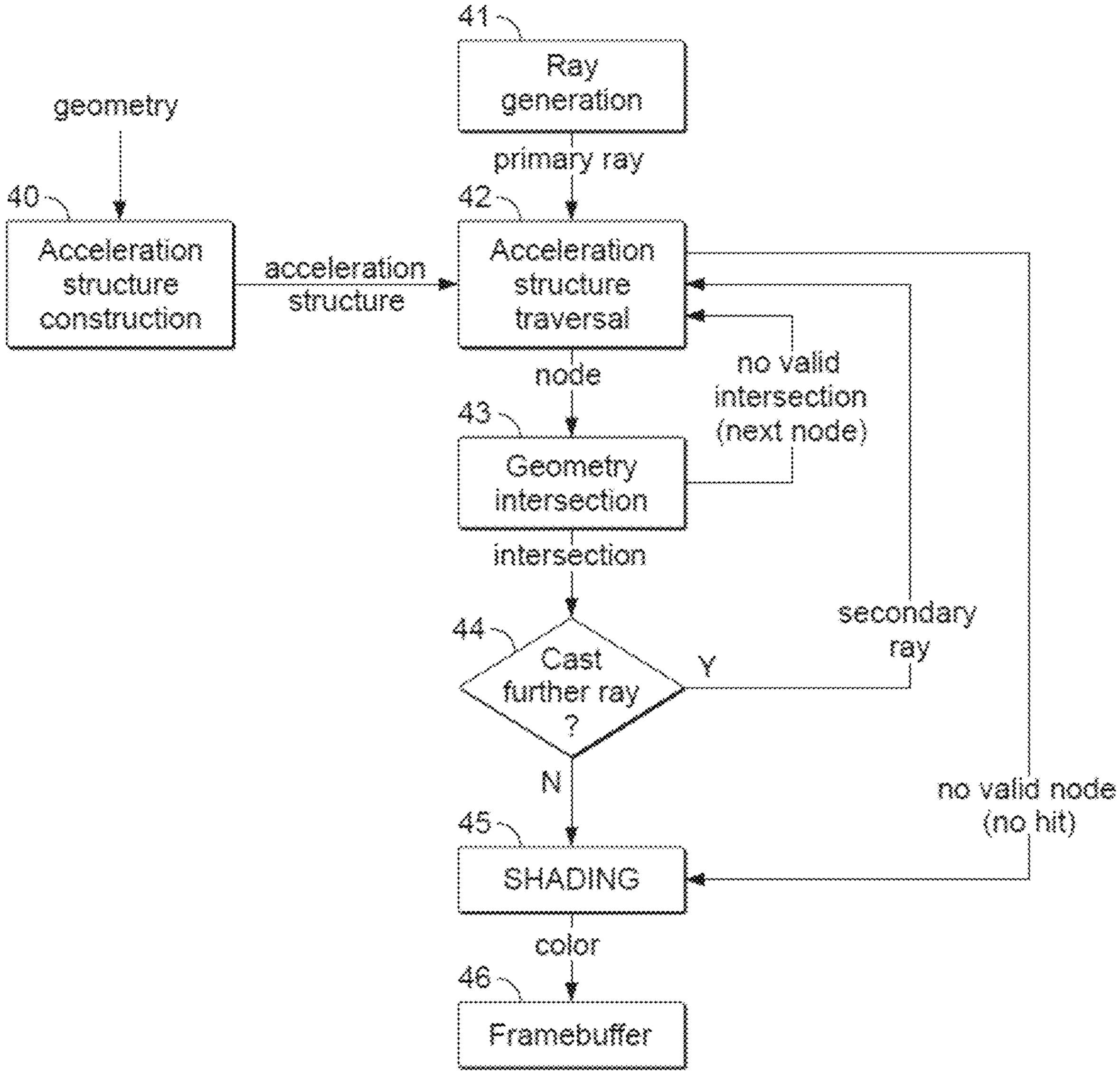
FIG. 4A and FIG. 4B are flow charts illustrating a full ray tracing process.

FIG. 4A is a flow chart showing an overall ray tracing process that may be performed on and by the graphics processor 2.

First, the geometry of the scene is analysed and used to obtain an acceleration data structure (step 40), for example in the form of one or more BVH tree structures, as discussed above. This can be done in any suitable and desired manner, for example by means of an initial processing pass on the graphics processor 2.

A primary ray is then generated, passing from a camera through a particular sampling position in an image plane (frame) (step 41). The acceleration data structure is then traversed for the primary ray (step 42), and the leaf node corresponding to the first volume that the ray passes through which contains geometry which the ray potentially intersects is identified. It is then determined whether the ray intersects any of the geometry, e.g. primitives, (if any) in that leaf node (step 43).

If no (valid) geometry which the ray intersects can be identified in the node, the process returns to step 42, and the ray continues to traverse the acceleration data structure and the leaf node for the next volume that the ray passes through which may contain geometry with which the ray intersects is identified, and a test for intersection performed at step 43.

This is repeated for each leaf node that the ray (potentially) intersects, until geometry that the ray intersects is identified.

When geometry that the ray intersects is identified, it is then determined whether to cast any further (secondary) rays for the primary ray (and thus sampling position) in question (step 44). This may be based, e.g., and in an embodiment, on the nature of the geometry (e.g. its surface properties) that the ray has been found to intersect, and the complexity of the ray tracing process being used.

Thus, as shown in FIG. 4A, one or more secondary rays may be generated emanating from the intersection point (e.g. a shadow ray(s), a refraction ray(s) and/or a reflection ray(s), etc.). Steps 42, 43 and 44 are then performed in relation to each secondary ray.

Once there are no further rays to be cast, a shaded colour for the sampling position that the ray(s) correspond to is then determined based on the result(s) of the casting of the primary ray, and any secondary rays considered (step 45), taking into account the properties of the surface of the object at the primary intersection point, any geometry intersected by secondary rays, etc., The shaded colour for the sampling position is then stored in the frame buffer (step 46).

If no (valid) node which may include geometry intersected by a given ray (whether primary or secondary) can be identified in step 42 (and there are no further rays to be cast for the sampling position), the process moves to step 45, and shading is performed. In this case, the shading is in an embodiment based on some form of "default" shading operation that is to be performed in the case that no intersected geometry is found for a ray. This could comprise, e.g., simply allocating a default colour to the sampling position, and/or having a defined, default geometry to be used in the case where no actual geometry intersection in the scene is found, with the sampling position then being shaded in accordance with that default geometry. Other arrangements are possible.

This process is performed for each sampling position to be considered in the image plane (frame). Once the final output value for the sampling position in question has been generated, the processing in respect of that sampling position is completed. A next sampling position may then be processed in a similar manner, and so on, until all the sampling positions for the frame have been appropriately shaded. The frame may then be output, e.g. for display, and the next frame to be rendered processed in a similar manner, and so on.

Figure 4B:
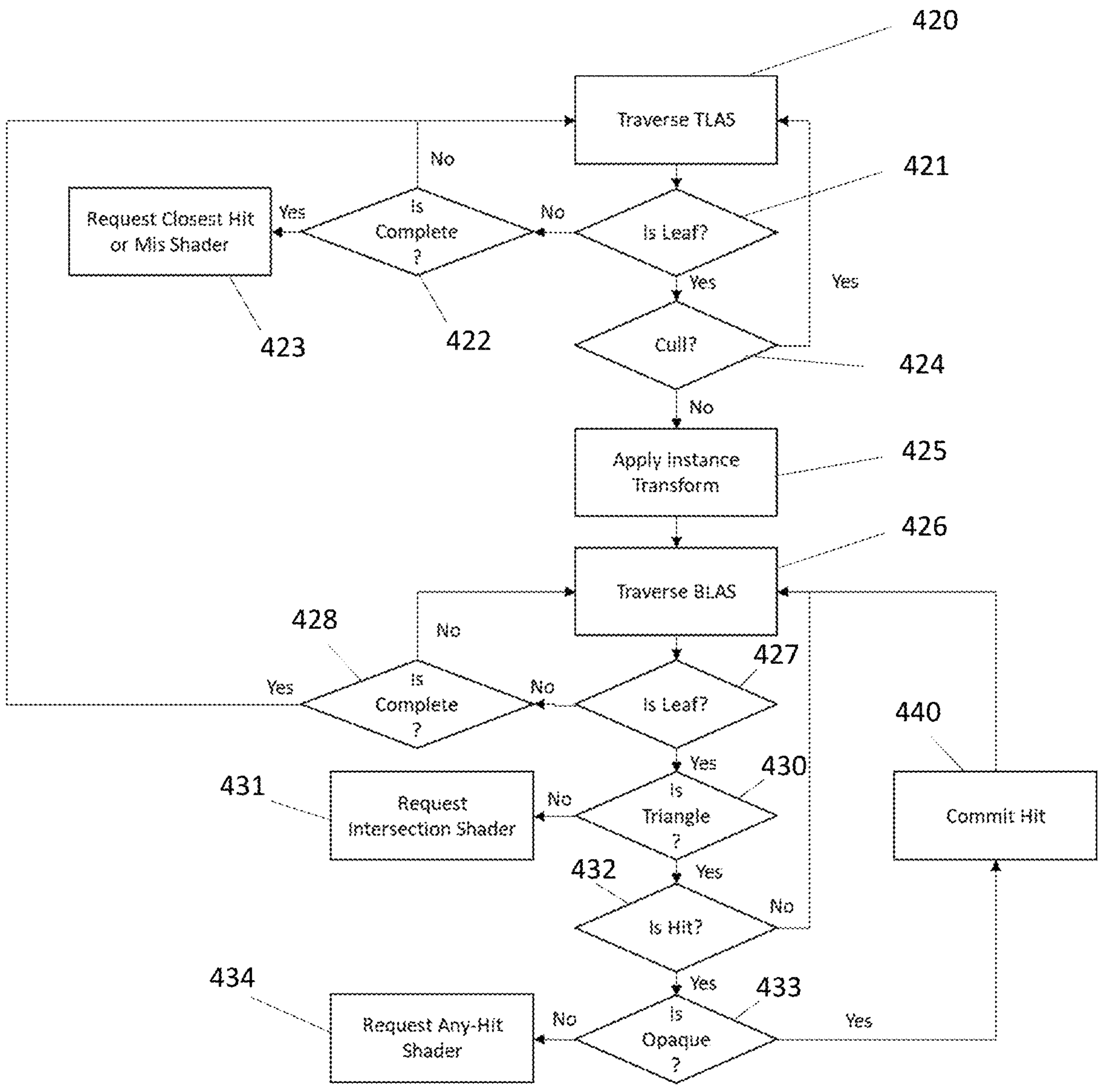

FIG. 4B is a flow chart showing in more detail acceleration structure traversal in the case of a two-level acceleration data structure, e.g. as described above with reference to FIG. 3B. As shown in FIG. 4B, in this case, acceleration structure traversal begins with TLAS traversal (step 420), and TLAS traversal continues in search of a TLAS leaf node (steps 421, 422). If no TLAS leaf node can be identified, a "default" shading operation ("miss shader") may be performed (step 423), e.g. as described above.

When (at step 421) a TLAS leaf node is identified, it is determined whether that leaf node can be culled from further processing (step 424). If it can be culled from further processing, the process returns to TLAS traversal (step 420).

If the TLAS leaf node cannot be culled from further processing, instance transform information associated with the leaf node is used to transform the ray to the appropriate space for BLAS traversal (step 425). BLAS traversal then begins (step 426), and continues in search of a BLAS leaf node (steps 427, 428). If no BLAS leaf node can be identified, the process may return to TLAS traversal (step 420).

In the present embodiments, geometry associated with a BLAS leaf node can be in the form of a set of triangle primitives or an axis-aligned bounding box (AABB) primitive. When (at step 427) a BLAS leaf node is identified, it is determined whether geometry associated with the leaf node is in the form of a set of triangle primitives or an axis-aligned bounding box (AABB) primitive (step 430).

As shown in FIG. 4B, when an axis-aligned bounding box (AABB) primitive is encountered, execution of a shader program ("intersection shader") that defines a procedural object encompassed by the axis-aligned bounding box (AABB) is triggered (step 431) to determine whether a ray intersects the procedural object defined by the shader program. On the other hand, when a set of triangle primitives is encountered, determining whether a ray intersects any of the triangle primitives is performed by fixed function circuitry (step 432). Other arrangements would be possible.

If no (valid) triangle primitives which the ray intersects can be identified in the node, the process returns to BLAS traversal (step 426).

If a ray is found to intersect a triangle primitive 25, it is determined whether or not the triangle primitive 25 is opaque at the intersection point 24 (step 433). In the case of the triangle primitive intersection point 24 being found to be non-opaque, execution of an appropriate shader program ("any-hit shader") may be triggered (step 434). Otherwise, in the case of the triangle primitive intersection point 24 being found to be opaque, the intersection can be committed without executing a shader program (step 440). Traversal for one or more secondary rays may be triggered, as appropriate, e.g. as discussed above.

Figure 5:
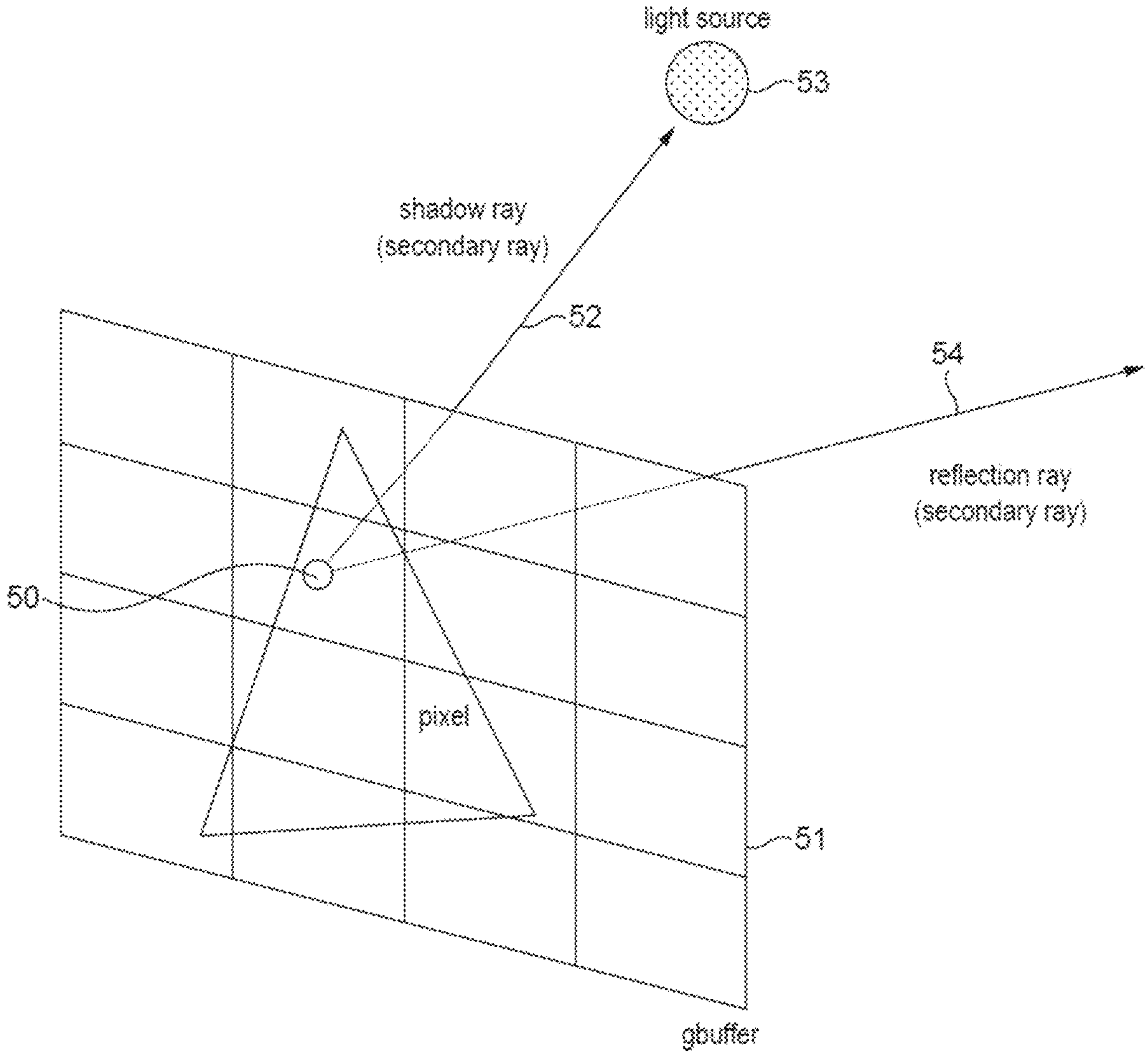
FIG. 5 is a schematic diagram illustrating a "hybrid" ray tracing process.

FIG. 5 shows an alternative ray tracing process which may be used in embodiments of the technology described herein, in which only some of the steps of the full ray tracing process described above are performed. Such an alternative ray tracing process may be referred to as a "hybrid" ray tracing process.

In this process, as shown in FIG. 5, the first intersection point 50 for each sampling position in the image plane (frame) is instead determined first using a rasterisation process and stored in an intermediate data structure known as a "G-buffer" 51. Thus, the process of generating a primary ray for each sampling position, and identifying the first intersection point of the primary ray with geometry in the scene, is replaced with an initial rasterisation process to generate the "G-buffer". The G-buffer includes information indicative of the depth, colour, normal and surface properties (and any other appropriate and desired data, e.g. albedo, etc.) for each first (closest) intersection point for each sampling position in the image plane (frame).

Secondary rays, e.g. shadow ray 52 to light source 53, and reflection ray 54, may then be cast starting from the first intersection point 50, and the shading of the sampling positions determined based on the properties of the geometry first intersected, and the interactions of the secondary rays with geometry in the scene.

Referring to the flowchart of FIG. 4A, in such a hybrid process, the initial pass of steps 41, 42 and 43 of the full ray tracing process for a primary ray will be omitted, as there is no need to cast primary rays and determine their first intersection with geometry in the scene. The first intersection point data for each sampling position is instead obtained from the G-buffer.

The process may then proceed to the shading stage 45 based on the first intersection point for each pixel obtained from the G-buffer, or where secondary rays emanating from the first intersection point are to be considered, these will need to be cast in the manner described by reference to FIG. 4. Thus, steps 42, 43 and 44 will be performed in the same manner as previously described in relation to the full ray tracing process for any secondary rays.

The colour determined for a sampling position will be written to the frame buffer in the same manner as step 46 of FIG. 4A, based on the shading colour determined for the sampling position based on the first intersection point (as obtained from the G-buffer), and, where applicable, the intersections of any secondary rays with objects in the scene, determined using ray tracing.

Figure 6:
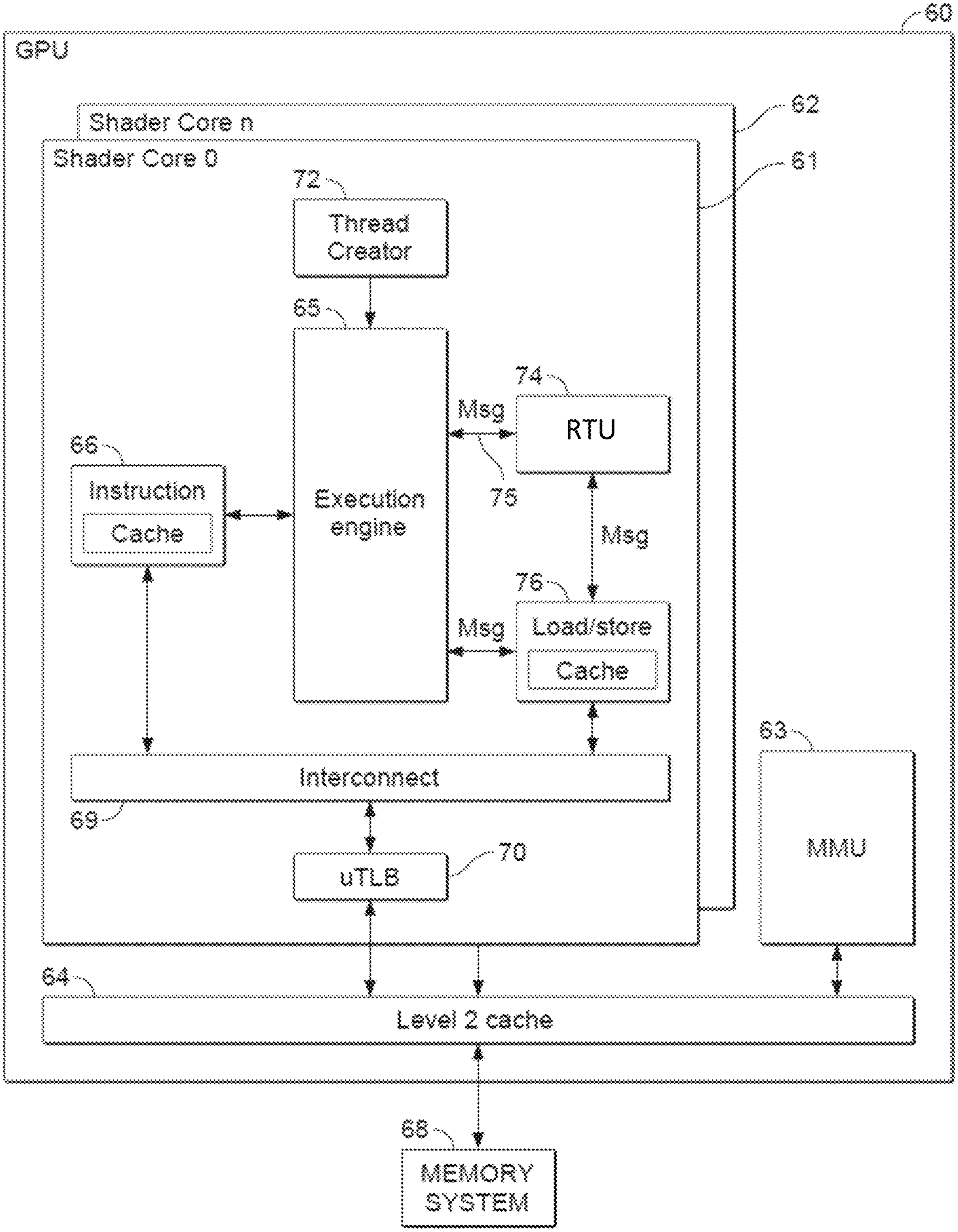
FIG. 6 shows schematically an embodiment of a graphics processor that can be operated in the manner of the technology described herein.

FIG. 6 shows schematically the relevant elements and components of a graphics processor (GPU) 2, 60 of the present embodiments.

As shown in FIG. 6, the GPU 60 includes one or more shader (processing) cores 61, 62 together with a memory management unit ("MMU") 63 and a level 2 cache 64 which is operable to communicate with an off-chip memory system 68 (e.g. via an appropriate interconnect and (dynamic) memory controller).

FIG. 6 shows schematically the relevant configuration of one shader core 61, but as will be appreciated by those skilled in the art, any further shader cores of the graphics processor 60 will be configured in a corresponding manner.

The graphics processor (GPU) shader cores 61, 62 are programmable processing units (circuits) that perform processing operations by running small programs for each "item" in an output to be generated such as a render target, e.g. frame. An "item" in this regard may be, e.g. a vertex, one or more sampling positions, etc., The shader cores will process each "item" by means of one or more execution threads which will execute the instructions of the shader program(s) in question for the "item" in question. Typically, there will be multiple execution threads each executing at the same time (in parallel).

FIG. 6 shows the main elements of the graphics processor 60 that are relevant to the operation of the present embodiments. As will be appreciated by those skilled in the art there may be other elements of the graphics processor 60 that are not illustrated in FIG. 6. It should also be noted here that FIG. 6 is only schematic, and that, for example, in practice the shown functional units may share significant hardware circuits, even though they are shown schematically as separate units in FIG. 6. It will also be appreciated that each of the elements and units, etc., of the graphics processor as shown in FIG. 6 may, unless otherwise indicated, be implemented as desired and will accordingly comprise, e.g., appropriate circuits (processing logic), etc., for performing the necessary operation and functions.

As shown in FIG. 6, each shader core of the graphics processor 60 includes an appropriate programmable execution unit (execution engine) 65 that is operable to execute graphics shader programs for execution threads to perform graphics processing operations.

The shader core 61 also includes an instruction cache 66 that stores instructions to be executed by the programmable execution unit 65 to perform graphics processing operations. The instructions to be executed will, as shown in FIG. 6, be fetched from the memory system 68 via an interconnect 69 and a micro-TLB (translation lookaside buffer) 70.

The shader core 61 also includes an appropriate load/store unit 76 in communication with the programmable execution unit 65, that is operable, e.g., to load into an appropriate cache, data, etc., to be processed by the programmable execution unit 65, and to write data back to the memory system 68 (for data loads and stores for programs executed in the programmable execution unit). Again, such data will be fetched/stored by the load/store unit 76 via the interconnect 69 and the micro-TLB 70.

In order to perform graphics processing operations, the programmable execution unit 65 will execute graphics shader programs (sequences of instructions) for respective execution threads (e.g. corresponding to respective sampling positions of a frame to be rendered). Accordingly, as shown in FIG. 6, the shader core 61 further comprises a thread creator (generator) 72 operable to generate execution threads for execution by the programmable execution unit 65.

As shown in FIG. 6, the shader core 61 in this embodiment also includes a ray tracing circuit (unit) ("RTU") 74, which is in communication with the programmable execution unit 65, and which is operable to perform the required ray-volume testing during the ray tracing acceleration data structure traversals (e.g. the operation of steps 420 and 426 of FIG. 4B) for rays being processed as part of a ray tracing-based rendering process, in response to messages 75 received from the programmable execution unit 65. In the present embodiments the RTU 74 is also operable to perform the required ray-triangle testing (e.g. the operation of step 432 of FIG. 4B). The RTU 74 is also able to communicate with the load/store unit 76 for loading in the required data for such intersection testing.

In the present embodiments, the RTU 74 of the graphics processor is a (substantially) fixed-function hardware unit (circuit) that is configured to perform the required ray-volume and ray-triangle intersection testing during a traversal of a ray tracing acceleration data structure to determine geometry for a scene to be rendered that may be (and is) intersected by a ray being used for a ray tracing operation. However, some amount of configurability may be provided.

Other arrangements would be possible. For example, ray-volume and/or ray-triangle intersection testing may be performed by the programmable execution unit 65 (e.g. in software).

The traversal operation may be managed using a traversal stack that includes stack entries that each indicate a node to be visited and tested, with the top entry in the stack indicating the next node to be visited and tested for a ray. The top entry in the stack is accordingly popped to determine the next node to visit and test, and when it is determined that a new node should be visited and tested, a corresponding stack entry is pushed to the stack. The stack may be managed using a "last-in-first-out" scheme.

Figure 7A:
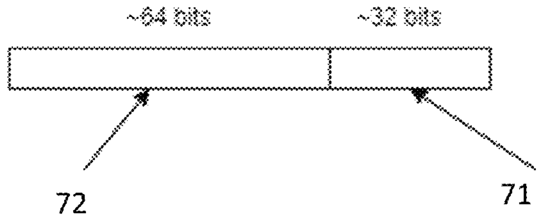
FIG. 7A and FIG. 7B show schematically a stack layout that may be used for managing a ray tracing traversal operation.

FIG. 7A illustrates an exemplary stack entry. As shown in FIG. 7A, each stack entry includes node information 71 that includes information indicating a volume associated with a node to be tested and any child nodes that are associated with the node, and further information 72. The further information 72 for a stack entry that relates to a leaf node can indicate geometry represented by the leaf node in question (e.g. in the case of a BLAS leaf node) or references to one or more other (e.g. BLAS) acceleration structures together with shading and transformation information (e.g. in the case of a TLAS leaf node).

As shown in FIG. 7A, the node information 71 may comprise 32 bits, and the further information 72 may comprise 64 bits. A leaf node stack entry may thus comprise 96 bits, whereas an internal node stack entry may typically comprise only 32 bits.

Figure 7B:
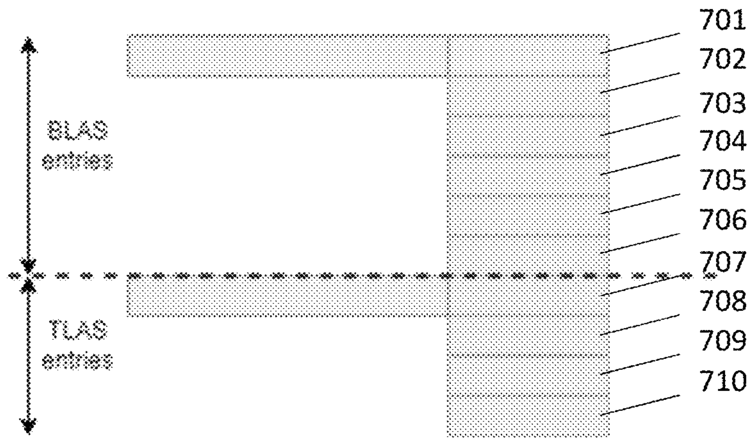

FIG. 7B illustrates an exemplary stack of entries to be processed by a shader core 61, 62. As shown in FIG. 7B, in this example, the stack includes six stack entries 701-706 for BLAS nodes at the top of the stack, and four stack entries 707-710 for TLAS nodes at the bottom of the stack.

Figure 8A:
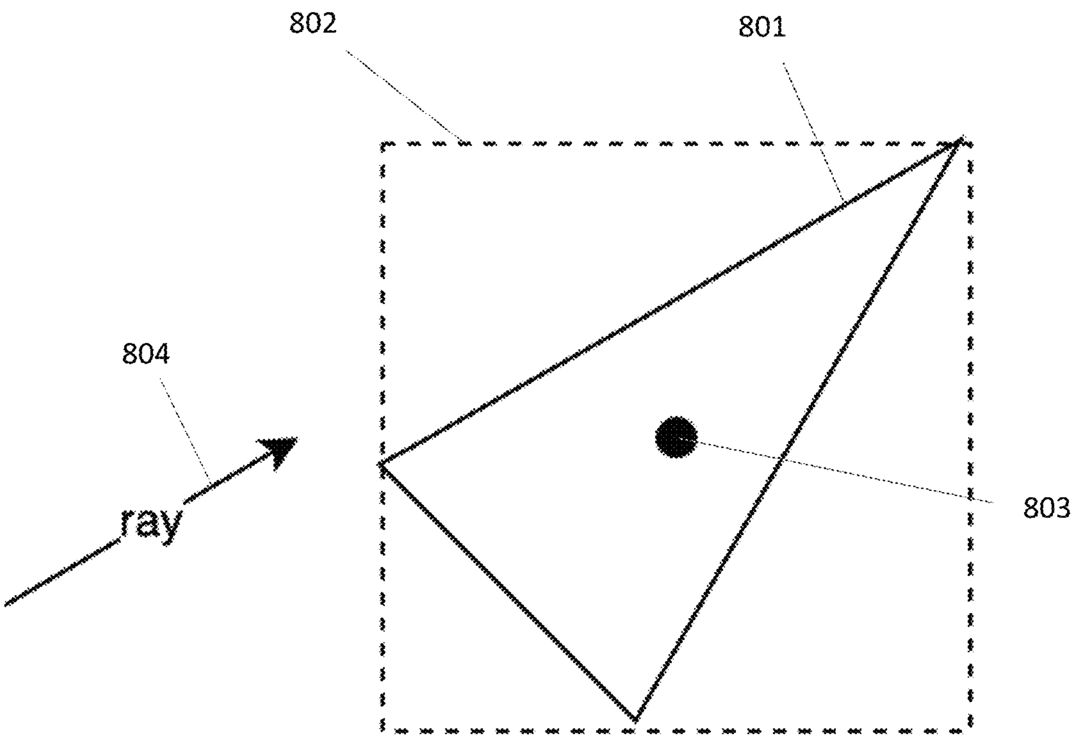
FIG. 8A illustrates exemplary leaf node intersection testing.

FIG. 8A shows an exemplary leaf node of a ray tracing acceleration data structure that contains a triangle primitive 801. The leaf node is defined by an axis-aligned bounding box (AABB) 802 centred on centroid position 803 (it will be appreciated here that FIG. 8A is a two-dimensional representation of a three-dimensional scene, and that AABB 802 will have a volume).

FIG. 8A also shows an exemplary ray 804 that is being tested against the leaf node. As described above, a ray-volume intersection test may first be performed to determine whether the ray 804 intersects the leaf node AABB 802. In this example, ray 804 does intersect AABB 802, and so a ray-triangle intersection test may then be performed to determine whether ray 804 intersects the triangle primitive 801. In this example, ray 804 does not intersect triangle primitive 801, and so acceleration data structure traversal for the ray 804 may continue in search of geometry that the ray 804 does intersect.

The Applicant has recognised that the situation illustrated in FIG. 8A, in which a ray intersects an AABB but does not intersect a triangle primitive defined within the AABB, can occur relatively frequently, e.g. due to the shape of an AABB not tightly wrapping around the shape of a triangle primitive. This can result in a relatively large number of ray-triangle intersection tests having to be performed. While it would be possible to reduce the number of ray-triangle intersection tests performed by using acceleration data structure bounding volumes that can more closely wrap around the underlying geometry, such as oriented bounding boxes (OBBs), such approaches can significantly increase the processing effort required to build and traverse the ray tracing acceleration data structure, as compared to using axis-aligned bounding boxes (AABBs).

Figure 8B:
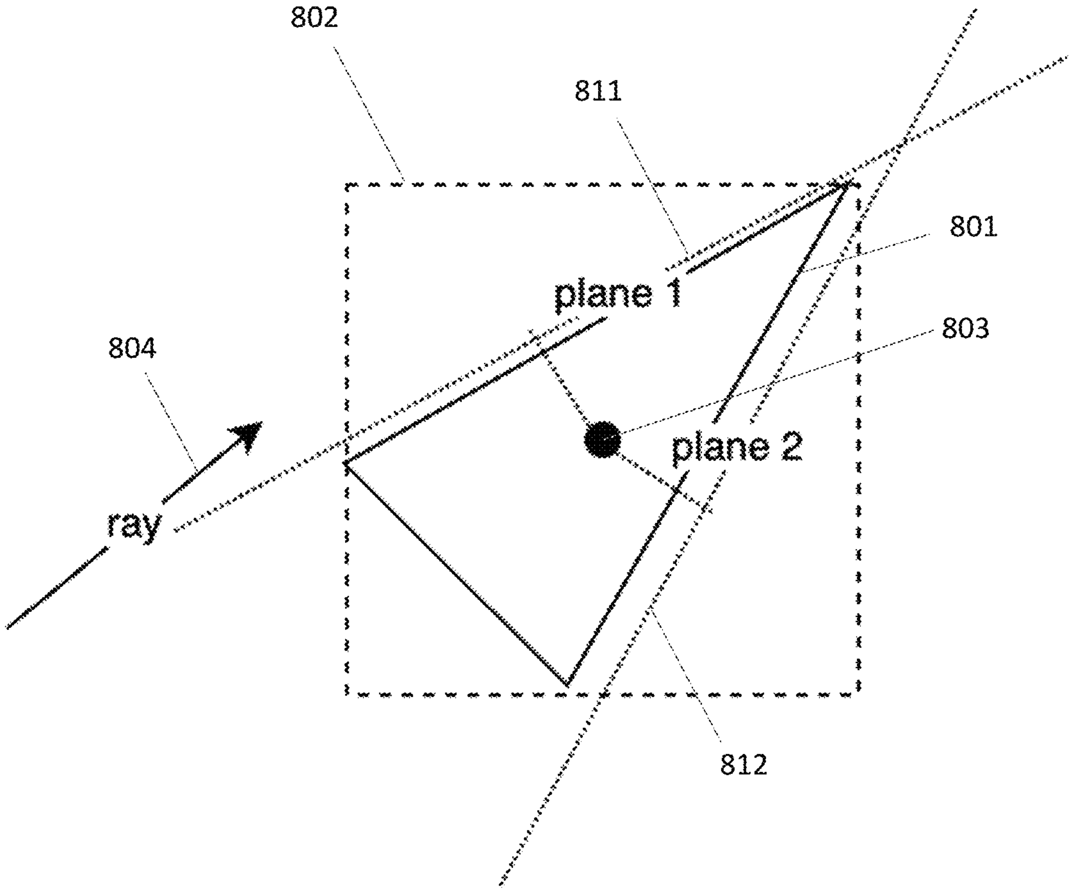
FIG. 8B illustrates exemplary leaf node intersection testing in accordance with embodiments of the technology described herein.

FIG. 8B illustrates an embodiment of the technology described herein. FIG. 8B shows an exemplary leaf node of a ray tracing acceleration data structure that contains a triangle primitive 801. As with the example of FIG. 8A, the leaf node of FIG. 8B is defined by an axis-aligned bounding box (AABB) 802 having centroid position 803. In contrast to the example of FIG. 8A, in this embodiment, two planes 811, 812 are provided that each indicate an empty region of the AABB 802 (i.e. a region of the AABB 802 that does not contain a triangle primitive). Each plane may be specified by a (shortest) distance from the centroid position 803 and a normal vector pointing toward the empty side of the plane. (Other arrangements are possible. For example, a normal vector could point toward the non-empty side of a plane). Referring back to FIG. 7A, this plane-defining data may be stored in the further information 72 for a stack entry that relates to the corresponding parent node.

FIG. 8B also shows an exemplary ray 804 that is being tested against the leaf node. In this embodiment, as with the example of FIG. 8A, a ray-volume intersection test is first performed to determine whether the ray 804 intersects the leaf node AABB 802. In contrast with the example of FIG. 8A, in this embodiment, if it is determined that ray 804 does intersect AABB 802, ray-plane intersection testing is performed to determine whether the ray 804 only intersects a region of AABB 802 that at least one of the planes 811, 812 indicates is empty (and thus whether the ray 804 intersects a region of the AABB 802 that may contain a triangle primitive). A ray-triangle intersection test is then only performed if the ray-plane intersection testing indicates that the ray 804 does intersect a region of the AABB 802 that may contain a triangle primitive (i.e. if the ray-plane intersection testing does not indicate that the ray 804 only intersects a region of AABB 802 that at least one of the planes 811, 812 indicates is empty).

In the embodiment of FIG. 8B, ray 804 does intersect AABB 802, and so ray-plane intersection testing is performed. In this embodiment, ray 804 only intersects a region of the AABB 802 that is indicated by plane 811 as being empty, and so it can be determined that ray 804 will not intersect triangle primitive 801 without having to perform a ray-triangle intersection test. The Applicant has found that performing this additional ray-plane intersection testing can improve efficiency and save overall processing effort as compared to the arrangement of FIG. 8A.

Figure 9:
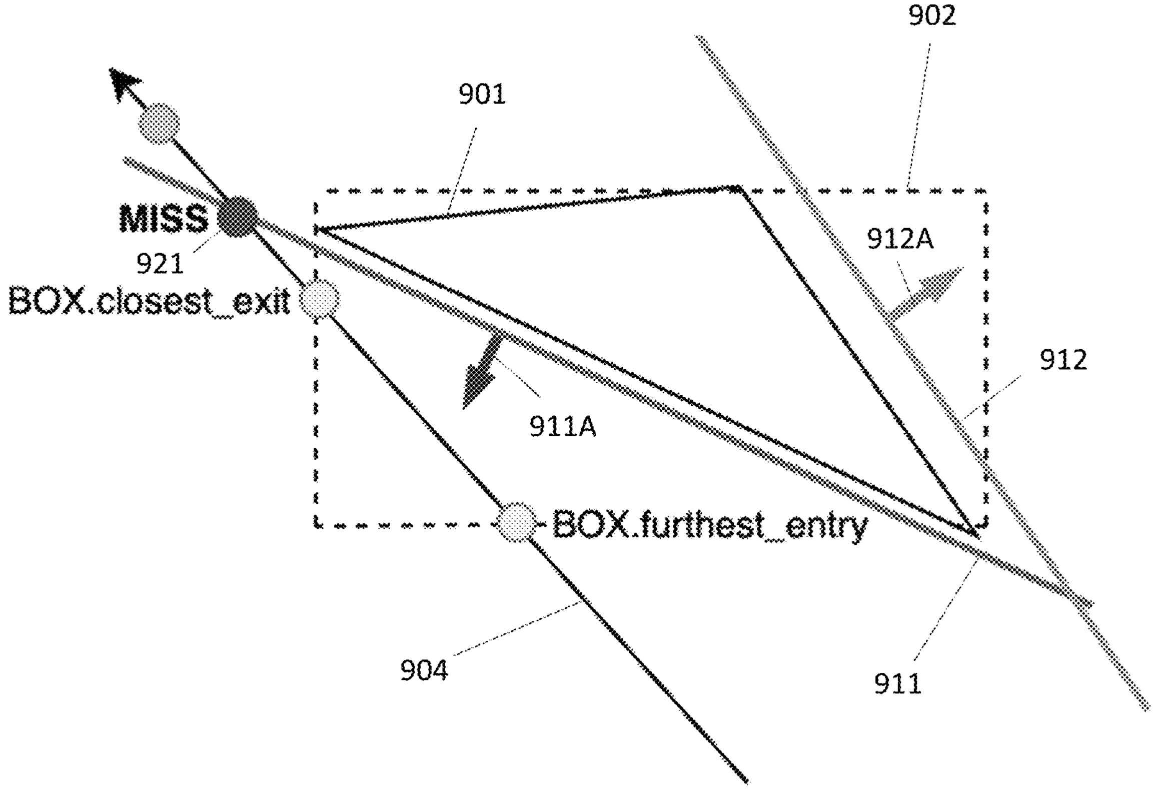
FIG. 9 illustrates exemplary leaf node intersection testing in accordance with embodiments of the technology described herein.

FIG. 9 illustrates an embodiment in more detail. FIG. 9 shows an exemplary leaf node defined by an axis-aligned bounding box (AABB) 902 that contains a triangle primitive 901. FIG. 9 also shows two planes 911, 912 that indicate respective empty regions of AABB 902 that do not contain a triangle primitive, and are specified by respective normal vectors 911A, 912A that point toward the empty side of the respective plane. FIG. 9 also shows an exemplary ray 904 that is being tested against the leaf node.

In this embodiment, a ray-volume intersection test is first performed to determine whether the ray 904 intersects the leaf node AABB 902. The ray-volume intersection test may be performed by determining whether the ray 904 enters and then exits the AABB 902 by calculating and comparing an entry point furthest from the ray's origin (BOX.furthest_entry) and an exit point closest to the ray's origin (BOX.closest_exit).

In this embodiment, ray 904 does intersect AABB 902, and so ray-plane intersection testing is then performed to determine whether ray 904 only intersects a region of AABB 902 that at least one of the planes 911, 912 indicates is empty. This may be done by calculating where the line representing ray 904 intersects each plane 911, 912, and comparing these line-plane intersection points with the AABB entry and exit points (BOX.furthest_entry and BOX.closest_exit). It can be determined that ray 904 will only intersect empty regions of AABB 902 if the line representing ray 904 crosses out of the empty side of a plane after the ray exits the AABB 902 (i.e. further from the ray origin than BOX.closest_exit) (or if the line representing ray 904 crosses into the empty side of a plane before the ray 904 enters the AABB 902 (i.e. closer to the ray origin than BOX.furthest_entry)).

In this embodiment, ray 904 crosses out of the empty side of plane 911 at intersection point 921, which is after (i.e. further from the ray origin than) the point where ray 904 exits the AABB 902 (BOX.closest_exit), and so ray 904 only intersects a region of AABB 902 that plane 911 indicates is empty. Accordingly, it can be determined that ray 904 will not intersect triangle primitive 901 without having to perform a ray-triangle intersection test.

Figure 10:
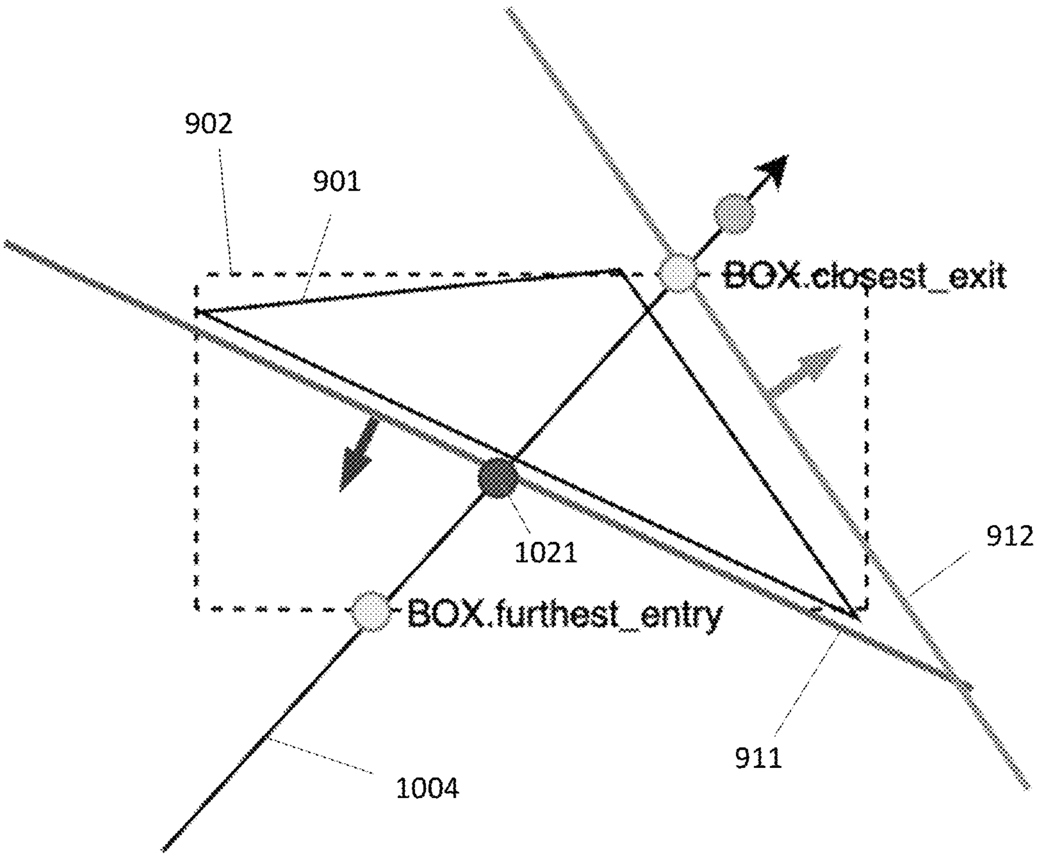
FIG. 10 illustrates exemplary leaf node intersection testing in accordance with embodiments of the technology described herein.

FIG. 10 shows the same triangle primitive 901, AABB 902 and planes 911, 912 as in the embodiment of FIG. 9, but with a different ray 1004. In this embodiment, ray 1004 intersects AABB 902, and so ray-plane intersection testing is performed to determine whether ray 1004 only intersects a region of AABB 902 that at least one of the planes 911, 912 indicates is empty.

In this embodiment, ray 1004 crosses out of the empty side of plane 911 at intersection point 1021, which is before the point where ray exits the AABB 902 (BOX.closest_exit), and so ray 1004 intersects a region of AABB 902 that plane 911 does not indicate is empty. Furthermore, ray 1004 crosses into the empty side of plane 912 at an intersection point that is after the ray 1004 enters the AABB 902 (BOX.furthest_entry), and so ray 1004 also intersects a region of AABB 902 that plane 912 does not indicate is empty. Accordingly, in this case, it cannot be determined from the ray-plane intersection testing that ray 1004 does not intersect triangle primitive 901, and so a ray-triangle intersection test may then be performed to determine whether ray 1004 does in fact intersect triangle primitive 901. In this case, ray 1004 does intersect triangle primitive 901, and so a ray-triangle intersection test will indicate that ray 1004 does intersect triangle primitive 901.

Figure 11:
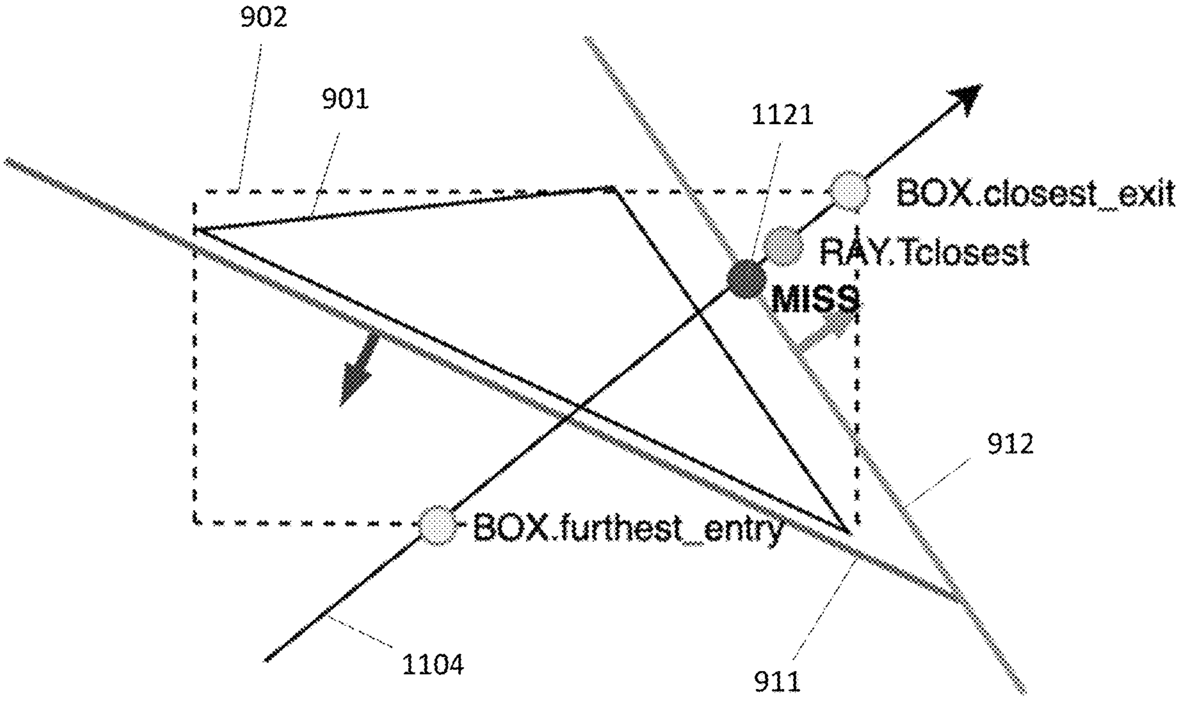
FIG. 11 illustrates exemplary leaf node intersection testing in accordance with embodiments of the technology described herein.

As well as "front-side plane culling" as described above, planes 911, 912 may also be used for "back-side plane culling". This is illustrated by FIG. 11. FIG. 11 shows the same triangle primitive 901, AABB 902 and planes 911, 912 as in the embodiments of FIGS. 9 and 10. FIG. 11 further shows a ray 1104 that is associated with a range, from a minimum ray length (RAY.Tclosest) to a maximum ray length (RAY.Tmax), outside of which geometry intersections are ignored.

In this embodiment, a ray-volume intersection test is first performed to determine whether the ray 1104 intersects the leaf node AABB 902 inside the ray range (RAY.Tclosest to RAY.Tmax). This may be done by determining whether the line representing ray 1104 exits the AABB 902 after the minimum ray length (by comparing BOX.closest_exit and RAY.Tclosest) (and by determining whether the line representing ray 1104 enters the AABB 902 after the maximum ray length (by comparing BOX.furthest_entry and RAY.Tmax)).

In this embodiment, ray 1104 does intersect AABB 902 within the ray range, and so ray-plane intersection testing is then performed. In this embodiment, the ray-plane intersection testing determines, by comparing the ray-plane intersection point 1121 and the minimum ray length (RAY.Tclosest), that within the ray range, ray 1104 only intersects a region of AABB 902 that plane 912 indicates is empty. Accordingly, it can be determined that ray 1104 will not intersect triangle primitive 901 within the ray range (without having to perform a ray-triangle intersection test).

Figure 12:
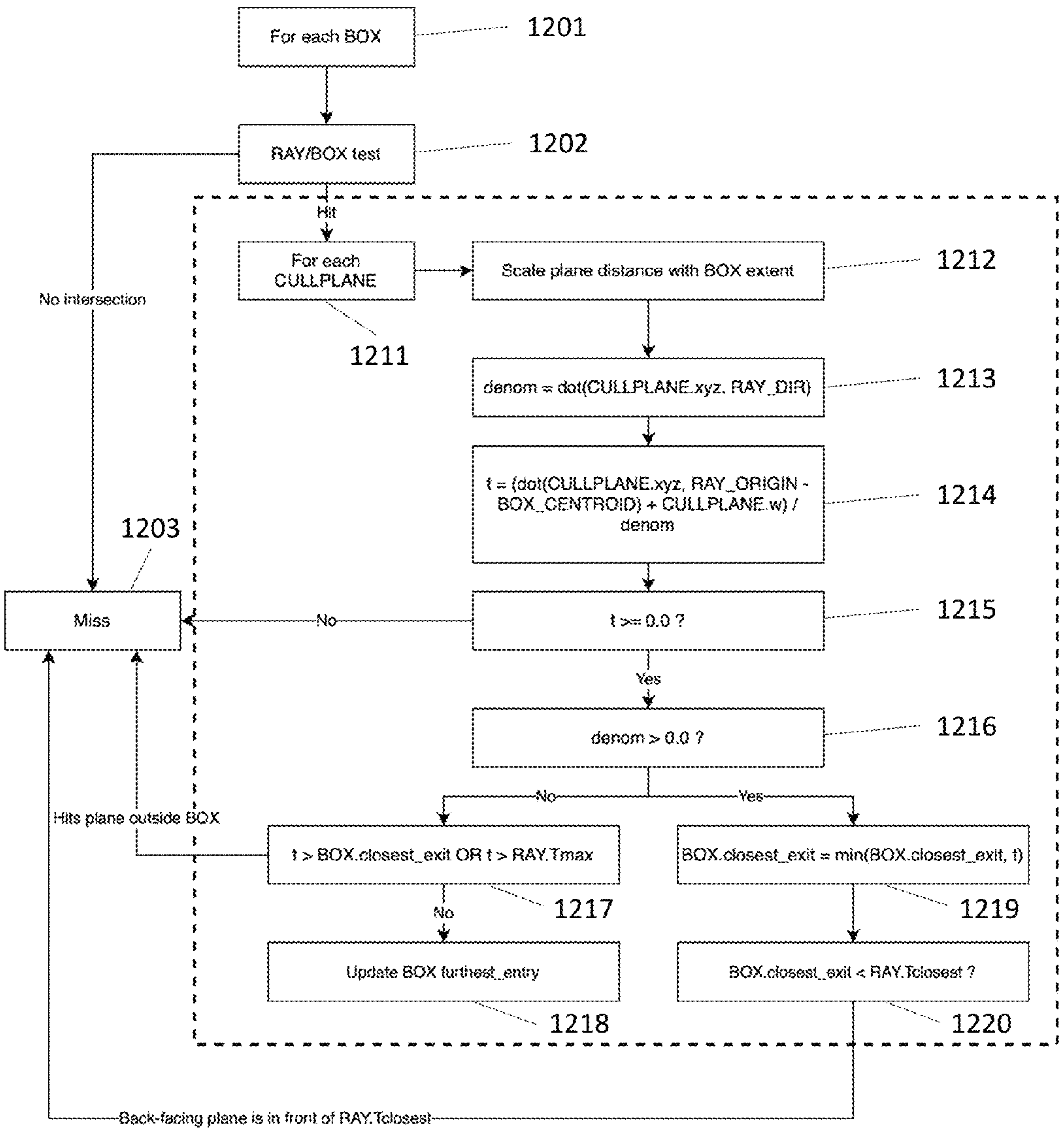
FIG. 12 is a flow chart illustrating a process of leaf node intersection testing in accordance with embodiments of the technology described herein.

FIG. 12 illustrates an acceleration data structure traversal process in accordance with embodiments of the technology described herein. As shown in FIG. 12, a ray-volume intersection test may be performed in respect of each child node volume of a parent node (steps 1201-1202). If it is determined that the ray does not intersect a child node AABB, it can be determined that the ray will not intersect any geometry within that AABB (step 1203). If the ray is found to intersect an AABB, however, ray-plane intersection testing may be performed in respect of each plane associated with that AABB (steps 1211-1220).

In this embodiment, a ray-plane intersection test first checks whether a ray will intersect a plane (steps 1212-1215). This may be done by determining a value of t, which indicates a distance from the ray's origin to the ray-plane intersection point in the ray's direction. As illustrated in FIG. 12, t may be determined from the vector representing the ray's direction (RAY_DIR), the ray's origin position (RAY_ORIGIN), the AABB centroid position (BOX_CENTROID), the plane's normal vector (CULLPLANE.xyz), and the plane's distance from the AABB centroid position (CULLPLANE.w). A negative value of t (at step 1215) indicates that the plane is "behind" the ray, and so the plane may not be considered further (step 1203).

Otherwise (if the plane is "in front" of the ray), the side from which the ray crosses the plane is determined (step 1216). This may be done using the dot product of the plane's normal vector (CULLPLANE.xyz) and the vector representing the ray's direction (RAY_DIR). If this dot product is greater than zero, then the plane's normal vector and the ray are pointing in corresponding directions, and so the ray crosses the plane from the non-empty side into the empty side. Otherwise (if the dot product is less than zero), the plane's normal vector and the ray are pointing in different directions, and so the ray will cross the plane from the empty side into the non-empty side.

If (at step 1216) it is determined that the ray crosses the plane from the empty side into the non-empty side, it is determined whether the ray crosses the plane after the ray exits the AABB (i.e. further from the ray origin than BOX.closest_exit) or after the maximum length of the ray (i.e. further from the ray origin than RAY.Tmax) (step 1217). If the ray crosses the plane from the empty side into the non-empty side after the ray exits the AABB (i.e. further from the ray origin than BOX.closest_exit) or after the maximum length of the ray (i.e. further from the ray origin than RAY.Tmax), it can be determined that the ray will not intersect any geometry within the AABB (step 1203) (without having to perform a ray-triangle intersection test).

Otherwise (if the ray crosses the plane from the empty side into the non-empty side before the ray exits the AABB and before the maximum length of the ray), it cannot be determined that the ray will not intersect any geometry within the AABB (and so a ray-triangle intersection test may need to be performed). In this case, the ray's entry point into the AABB (BOX.furthest_entry) may be updated to correspond to the point at which the ray crosses the plane (step 1218).

If (at step 1216) it is determined that the ray crosses the plane from the non-empty side into the empty side (after BOX.furthest_entry), then, if the point at which the ray crosses the plane is closer to the ray's origin than the current closest exit distance (BOX.closest_exit), the closest exit point (BOX.closest_exit) may be updated to correspond to the point at which the ray crosses the plane (step 1219), and then the closest exit point (BOX.closest_exit) may be compared with the minimum ray length (RAY.Tclosest) (step 1220). If the closest exit point (BOX.closest_exit) is before the minimum ray length (RAY.Tclosest), it can be determined that, within the ray range, the ray will not intersect any geometry within the AABB (step 1203) (without having to perform a ray-triangle intersection test).

Figure 13:
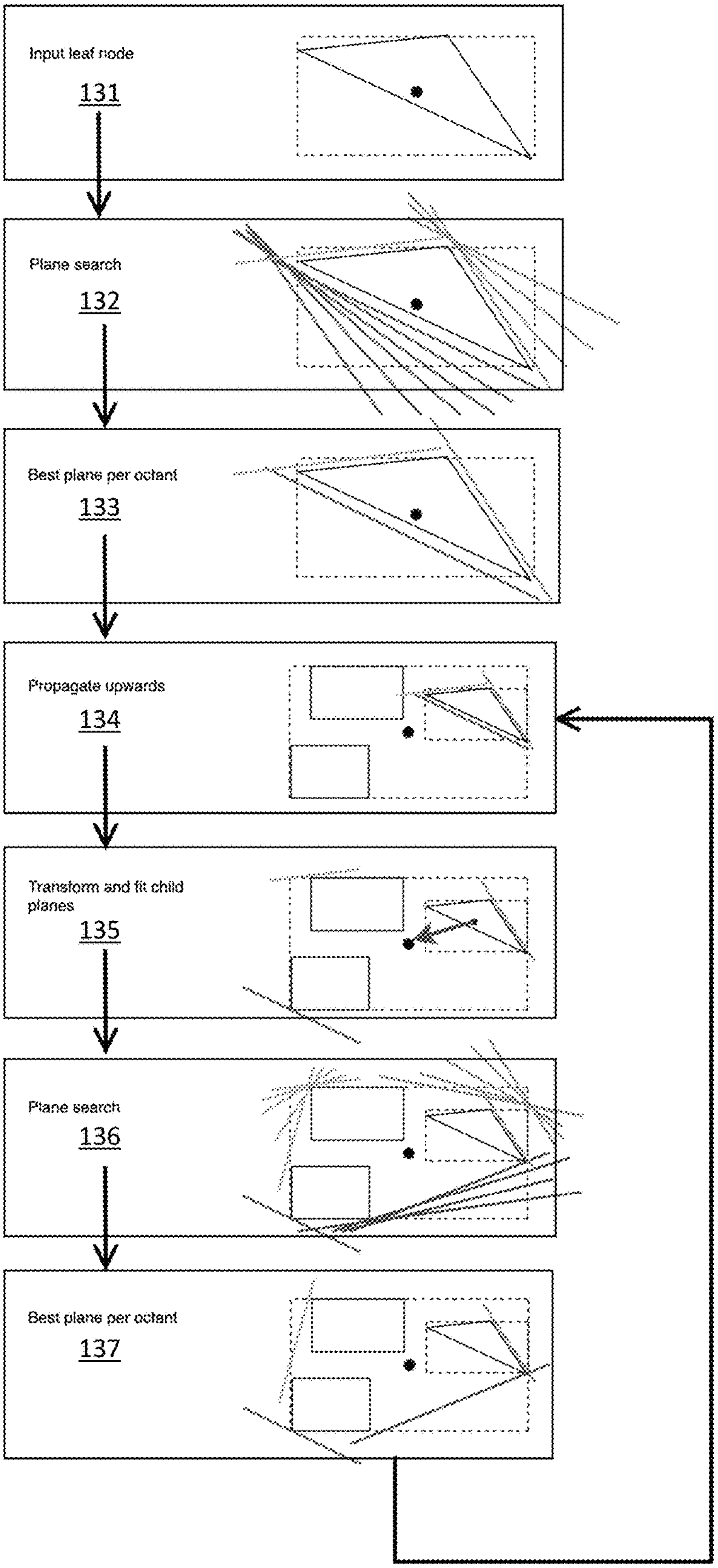
FIG. 13 illustrates a process of acceleration data structure generation in accordance with embodiments of the technology described herein; and Like reference numerals are used for like components where appropriate in the drawings.

FIG. 13 illustrates a process of generating planes in accordance with embodiments of the technology described herein. FIG. 13 shows an exemplary leaf node defined by an AABB containing a triangle primitive that has been generated as part of the acceleration data structure generation process (at step 131). In this embodiment, planes are determined for the leaf node by generating sets of possible planes (step 132), and selecting an optimum plane for each octant (step 133).

As illustrated in FIG. 13, planes may be determined for higher level nodes of the ray tracing acceleration data structure by propagating a set of planes determined for a leaf node up to the parent node of the leaf node (step 134), and then translating the planes to fit around the other child node volumes of the parent node (step 135). This may be done by adjusting plane distance (CULLPLANE.w) but maintaining plane direction (CULLPLANE.xyz). This propagating and translating may be done for each child node of the parent node, and then an optimum plane for each octant of the parent node may be selected from the translated planes (step 136 and 137).

As shown in FIG. 13, the process of propagating planes upward and finding a set of optimum planes at that level may be repeated for the next higher level of the acceleration data structure hierarchy, and so on. A set of planes may be stored for some or all levels of the acceleration data structure hierarchy.

Each plane may be stored separately by storing a respective distance (CULLPLANE.w) and direction (CULLPLANE.xyz). Alternatively, the amount of storage required to store multiple planes may be reduced by data being shared between different planes. For example, different planes may share the same normal vector (CULLPLANE.xyz), but have different origin distances (CULLPLANE.w). For example, planes for multiple different child nodes of a parent node may be defined by the same normal vector (CULLPLANE.xyz) but different origin distances (CULLPLANE.w).

It will be appreciated from the above that embodiments of the technology described herein can accelerate ray tracing. This is achieved, in embodiments of the technology described herein, by determining whether a ray may intersect geometry associated with a node by testing the ray against two different types of geometric object associated with the node: a first type that defines the volume that the node represents, and a second type that defines a region of the volume that the node represents within which geometry does not fall.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

The invention claimed is:

1. A method of operating a graphics processing system that is operable to perform ray tracing using a ray tracing acceleration data structure that is representative of a distribution of geometry in a scene to be rendered, wherein the ray tracing acceleration data structure comprises a plurality of nodes, wherein each node of the plurality of nodes represents a respective volume and is associated with geometry of the scene that falls within the respective volume, and wherein each volume represented by a node of the plurality of nodes is defined by a respective geometric object of a first type; the method comprising:

for at least one node of the plurality of nodes of the ray tracing acceleration data structure: providing one or more geometric objects of a second, different type that define one or more empty regions of the volume represented by the node defined by the respective geometric object of the first type within which none of the geometry associated with the node falls; and tracing a ray by traversing the ray tracing acceleration data structure, and when a node is encountered for which one or more geometric objects of the second type have been provided: determining whether the ray may intersect geometry associated with the node by:

(i) testing the ray against the geometric object of the first type that defines the volume that the node represents to determine whether the ray intersects the volume, and when it is determined that the ray intersects the volume, testing the ray against the one or more geometric objects of the second type to determine whether the ray intersects one or more empty regions of the volume, and when it is not determined that the ray intersects one or more empty regions of the volume, determining that the ray may intersect geometry associated with the node; or (ii) testing the ray against the one or more geometric objects of the second type to determine whether the ray may intersect one or more empty regions of the volume, and when it is not determined that the ray may intersect one or more empty regions of the volume, testing the ray against the geometric object of the first type that defines the volume that the node represents to determine whether the ray intersects the volume, and when it is determined that the ray intersects the volume, determining that the ray may intersect geometry associated with the node.

2. The method of claim 1, wherein a geometric object of the second type provided for a node is a surface that divides the volume represented by the node defined by the respective geometric object of the first type into a region within which geometry associated with the node does fall and an empty region within which geometry associated with the node does not fall.

3. The method of claim 2, comprising testing the ray against a surface to determine whether the ray intersects an empty region of the volume by:

determining whether the ray crosses the surface from an empty side of the surface after exiting the volume, or to an empty side of the surface before entering the volume; and when it is determined that the ray crosses the surface from an empty side of the surface after exiting the volume, or to an empty side of the surface before entering the volume: determining that the ray intersects an empty region of the volume.

4. The method of claim 1, wherein a geometric object of the first type is an axis aligned bounding box (AABB), and a geometric object of the second type is a plane.

5. The method of claim 4, comprising:

providing at least two parallel planes; and storing data specifying the at least two parallel planes;

wherein the data specifying the at least two parallel planes comprises data common to the at least two parallel planes that indicates a direction perpendicular to the at least two parallel planes.

6. The method of claim 1, comprising when it is determined that the ray may intersect geometry associated with the node:

testing the ray against the geometry associated with the node to determine whether the ray intersects the geometry.

7. The method of claim 1, wherein providing a geometric object of the second type for a node comprises storing data specifying the geometric object of the second type in association with a parent node of the ray tracing acceleration data structure that the node is a child node of.

8. A method of generating a ray tracing acceleration data structure for use by a graphics processor; the method comprising:

generating a ray tracing acceleration data structure that is representative of a distribution of geometry in a scene to be rendered, wherein the ray tracing acceleration data structure comprises a plurality of nodes, wherein each node of the plurality of nodes represents a respective volume and is associated with geometry of the scene that falls within the respective volume, and wherein each volume represented by a node of the plurality of nodes is defined by a respective geometric object of a first type; and for at least one node of the plurality of nodes of the ray tracing acceleration data structure:

generating one or more geometric objects of a second, different type that define one or more empty regions of the volume represented by the node defined by the respective geometric object of the first type within which none of the geometry associated with the node falls; and storing data specifying the respective geometric object of the first type and data specifying the one or more geometric objects of the second type in association with a same node of the ray tracing acceleration data structure.

9. A non-transitory computer readable storage medium storing software code which when executing on a processor performs the method of claim 8.

10. A graphics processing system that is operable to perform ray tracing using a ray tracing acceleration data structure that is representative of a distribution of geometry in a scene to be rendered, wherein the ray tracing acceleration data structure comprises a plurality of nodes, wherein each node of the plurality of nodes represents a respective volume and is associated with geometry of the scene that falls within the respective volume, and wherein each volume represented by a node of the plurality of nodes is defined by a respective geometric object of a first type; the graphics processing system comprising:

a processing circuit configured to, for at least one node of a plurality of nodes of a ray tracing acceleration data structure: provide one or more geometric objects of a second, different type that define one or more empty regions of a volume represented by the node defined by the respective geometric object of the first type within which none of the geometry associated with the node falls; and a ray tracing circuit configured to trace a ray by traversing a ray tracing acceleration data structure, and when a node is encountered for which one or more geometric objects of the second type have been provided by the processing circuit: determine whether the ray may intersect geometry associated with the node by:

(i) testing the ray against a geometric object of the first type that defines a volume that the node represents to determine whether the ray intersects the volume, and when it is determined that the ray intersects the volume, testing the ray against the one or more geometric objects of the second type to determine whether the ray intersects one or more empty regions of the volume, and when it is not determined that the ray intersects one or more empty regions of the volume, determining that the ray may intersect geometry associated with the node; or (ii) testing the ray against the one or more geometric objects of the second type provided by the processing circuit to determine whether the ray may intersect one or more empty regions of the volume, and when it is not determined that the ray may intersect one or more empty regions of the volume, testing the ray against the geometric object of the first type that defines the volume that the node represents to determine whether the ray intersects the volume, and when it is determined that the ray intersects the volume, determining that the ray may intersect geometry associated with the node.

11. The system of claim 10, wherein a geometric object of the second type provided for a node is a surface that divides the volume represented by the node defined by the respective geometric object of the first type into a region within which geometry associated with the node does fall and an empty region within which geometry associated with the node does not fall.

12. The system of claim 10, wherein a geometric object of the first type is an axis aligned bounding box (AABB), and a geometric object of the second type is a plane.

13. The system of claim 10, wherein the ray tracing circuit is configured to, when it is determined that a ray may intersect geometry associated with a node:

test the ray against the geometry associated with the node to determine whether the ray intersects the geometry.

14. The system of claim 11, wherein the ray tracing circuit is configured to test a ray against a surface to determine whether the ray intersects an empty region of a volume by:

determining whether the ray crosses a surface from an empty side of the surface after exiting the volume, or to an empty side of the surface before entering the volume; and when it is determined that the ray crosses the surface from an empty side of the surface after exiting the volume, or to an empty side of the surface before entering the volume: determining that the ray intersects an empty region of the volume.

15. The system of claim 10, wherein the processing circuit is configured to provide a geometric object of the second type for a node by storing data specifying the geometric object of the second type in association with a parent node of a ray tracing acceleration data structure that the node is a child node of.

16. The system of claim 12, wherein the processing circuit is configured to:

provide at least two parallel planes; and store data specifying the at least two parallel planes;

wherein the data specifying the at least two parallel planes comprises data common to the at least two parallel planes that indicates a direction perpendicular to the at least two parallel planes.

17. A graphics processor comprising:

a ray tracing circuit operable to perform ray tracing using a ray tracing acceleration data structure that is representative of a distribution of geometry in a scene to be rendered, wherein the ray tracing acceleration data structure comprises a plurality of nodes, wherein each node of the plurality of nodes represents a respective volume and is associated with geometry of the scene that falls within the respective volume, and wherein each volume represented by a node of the plurality of nodes is defined by a respective geometric object of a first type; wherein the plurality of nodes includes at least one node for which one or more geometric objects of a second, different type are provided that define one or more empty regions of the volume represented by the node defined by the respective geometric object of the first type within which none of the geometry associated with the node falls; the graphics processor further comprising:

a testing circuit configured to, when a node is encountered by the ray tracing circuit for which one or more geometric objects of the second type are provided: determine whether the ray may intersect geometry associated with the node by:

(i) testing the ray against a geometric object of the first type that defines a volume that the node represents to determine whether the ray intersects the volume, and when it is determined that the ray intersects the volume, testing the ray against the one or more geometric objects of the second type to determine whether the ray intersects one or more empty regions of the volume, and when it is not determined that the ray intersects one or more empty regions of the volume, determining that the ray may intersect geometry associated with the node; or (ii) testing the ray against the one or more geometric objects of the second type to determine whether the ray may intersect one or more empty regions of the volume, and when it is not determined that the ray may intersect one or more empty regions of the volume, testing the ray against the geometric object of the first type that defines the volume that the node represents to determine whether the ray intersects the volume, and when it is determined that the ray intersects the volume, determining that the ray may intersect geometry associated with the node.

* * * * *